United States Patent
Lennen

(10) Patent No.: US 7,110,442 B2
(45) Date of Patent: Sep. 19, 2006

(54) METHOD AND APPARATUS FOR FAST ACQUISITION AND LOW SNR TRACKING IN SATELLITE POSITIONING SYSTEM RECEIVERS

(75) Inventor: Gary R. Lennen, Cupertino, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 11/100,169

(22) Filed: Apr. 5, 2005

(65) Prior Publication Data

US 2006/0056497 A1 Mar. 16, 2006

Related U.S. Application Data

(63) Continuation of application No. 09/512,243, filed on Feb. 24, 2000, now Pat. No. 6,888,879.

(51) Int. Cl.
*H04B 1/69* (2006.01)
(52) U.S. Cl. .................. 375/149; 342/135; 701/200; 708/201; 711/101
(58) Field of Classification Search ............... 375/377, 375/150, 130, 147, 140, 224, 145, 149; 342/134, 342/135; 701/200, 207, 213; 708/100, 200, 708/201, 210, 212, 235, 505, 495, 490; 711/100, 711/101
See application file for complete search history.

(56) References Cited

U.S. PATENT DOCUMENTS

| 5,420,593 | A |   | 5/1995 | Niles .......................... 342/357 |
| 5,488,630 | A | * | 1/1996 | Huignard et al. ........... 375/240 |
| 5,663,734 | A |   | 9/1997 | Krasner .................. 342/357.15 |
| 5,955,986 | A | * | 9/1999 | Sullivan ................. 342/357.05 |

OTHER PUBLICATIONS

Interface Control Document ICD-GPS200, Sep. 26, 1984, Rockwell International Corporation, Satellite Systems Division, Downey, CA 90241.
The GLONASS System Technical Characteristics and Performance, @ Working Paper, Special Committee on Future Air Navigation Systems (FANS), International Civil Aviation Organization (ICAO), Fourth Meeting, Montreal, Quebec, Canada, May 2-20, 1998.

* cited by examiner

Primary Examiner—Pankaj Kumar
(74) Attorney, Agent, or Firm—William E. Pelton, Esq.

(57) ABSTRACT

A satellite positioning system (SATPS) receiver has a mix of standard and enhanced digital channel processors. The standard digital channel processors perform continuous tracking. During a low SNR and/or fast acquisition mode, the enhanced digital channel processor accumulates samples of a SATPS signal that are identically positioned within corresponding PRN code repetition periods, and plays back the stored accumulated values of the samples in an integration period to a correlation section for correlation with a locally generated PRN code.

1 Claim, 33 Drawing Sheets

METHOD AND APPARATUS FOR FAST ACQUISITION AND LOW SNR TRACKING IN SATELLITE POSITIONING SYSTEM RECEIVERS

This is a Rule 1.53(b) continuation, and claims the benefit of priority, of application Ser. No. 09/512,243 filed Feb. 24, 2000, now U.S. Pat. No. 6,888.879.

BACKGROUND OF THE INVENTION

1. Field of the Invention

The present invention relates to apparatus and methods for improving signal acquisition and measurement by satellite positioning system receivers, and more particularly to acquiring and performing measurements on low signal to noise ratio (SNR) satellite signals, as well as to reducing acquisition times for satellite signals having normal received SNRs.

2. Description of Related Art

Satellite positioning system (SATPS) receivers such as Global Positioning System (GPS) and Global Orbiting Navigational System (GLONASS) receivers, make precise determinations of latitude, longitude, elevation and time by using time difference of arrival and Doppler measurement techniques on precisely-timed spread spectrum signals transmitted by orbiting satellites. The transmitted signals contain a number of components designed to enable the receivers to extract the requisite information. In GPS, each satellite transmits two spread spectrum carrier signals centered around separate frequencies. The L1 signal is centered about a frequency of 1575.42 MHZ, and is modulated with, among other things, the coarse/acquisition (C/A) pseudo-random noise (PRN) code and the precision (P) PRN code. The C/A-code has a 1.023 MHZ chip rate, and the P code has a 10.23 MHZ chip rate. The L2 signal is centered around a frequency of 1227.6 MHZ and, at present, the only PRN code it carries it the P-code. The PRN codes are different for each of the GPS satellites deployed and allow use of a plurality of GPS satellite signals transmitted at the same frequency. In contrast, each GLONASS satellite transmits using a carrier frequency uniquely assigned to that satellite.

Different types of PRN codes are used for different system applications. For example, within the GPS system, C/A code is used for low cost, less accurate commercial applications, and P-code is used for higher accuracy military applications. Each GPS satellite is assigned PRN codes unique to that satellite. In the case of GLONASS, all satellites use the same PRN code(s). For each SATPS satellite, the transmitted signal comprises the carrier modulated with low frequency (50 Hz, i.e., 20 msec period, for GPS) digital data bits, which include information such as the satellite's ephemeris (i.e., position), current time of day, and system status information, and further modulated with one or more PRN codes.

The typical SATPS receiver receives a composite signal consisting of one or more of the signals transmitted by the satellites within view, that is within a direct line-of-sight, as well as noise and any interfering signals. Because the signal transmitted by each satellite uses a PRN code or a carrier frequency unique to that satellite, the receiver may separate the signals from different satellites using code division multiple access (e.g., each GPS satellite has a unique PRN code) or frequency division multiple access (e.g., each GLONASS satellite has a unique carrier frequency) techniques. The composite signal is first fed to a down-converter which amplifies and filters the incoming composite signal, mixes it with a locally generated carrier reference signal, and thus produces a composite intermediate frequency (IF) signal. For a GPS receiver, a decoder or channel circuit then correlates the composite signal by multiplying it by a locally generated version of the PRN code signal assigned to a particular satellite of interest. If the locally generated PRN code signal is properly timed, the digital data from that particular satellite is then properly detected.

The PRN codes also provide a mechanism to precisely determine the signal transmission time from each satellite. By determining the transmission time from at least four satellites, and knowing each satellite's ephemeris and approximate time of day information, the receiver's three dimensional position, velocity and precise time of day may be calculated.

For more information on the format of the GPS system signals, see "Interface Control Document ICD-GPS-200, Sep. 26, 1984", published by Rockwell International Corporation, Satellite Systems Division, Downey, Calif. 90241.

For more information on the format of the GLONASS system signals, see "The GLONASS System Technical Characteristics and Performance,@ Working Paper, Special Committee on Future Air Navigation Systems (FANS), International Civil Aviation Organization (ICAO), Fourth Meeting, Montreal, Quebec, Canada, May 2–20, 1988.

There are many practical applications of SATPS receivers in which low SNR and fast acquisition are desirable, including, for example, operation of GPS receivers indoors, where the SNR available for acquisition and measurements may be substantially below normal GPS minimum received power levels. As another example, when a GPS receiver has been powered down for a significant length of time, knowledge of oscillator offset and time may be degraded. Fast acquisition improvement would allow the receiver to respond quickly after power-on with a position fix. Low SNR militates against fast acquisition. Since the search for low satellites under low SNR involves longer integration times, each search bin must be serviced rapidly in order to have reasonable response time.

Some attempts to achieve fast acquisition under low SNR are disclosed in the prior art. U.S. Pat. No. 5,663,734 describes a method for storing a one-second snapshot of IF samples in a memory device. The samples are subsequently processed in the frequency domain by a high speed digital signal processor to reduce acquisition time under low SNR.

U.S. Pat. No. 5,420,593 issued to M. Niles and assigned to Trimble Navigation Ltd. describes an apparatus and method for more rapidly acquiring GPS signals by storing digital samples in a memory device and reading them back into a correlator device at a clock rate substantially higher than the sampling rate.

SUMMARY OF THE INVENTION

An object of the present invention is to provide improved signal acquisition and measurement in satellite positioning system receivers and in particular to provide fast acquisition by SATPS receivers under low SNR.

In accordance with an independent aspect of the invention, an enhanced digital channel processor for a satellite positioning system (SATPS) receiver is provided, comprising a memory processor having a storage device. During a low SNR and/or fast acquisition mode, said memory processor accumulates samples of a down-converted SATPS signal that are substantially identically positioned within corresponding ones of a plurality of PRN code repetition periods in an integration period, stores in said storage device the accumulated sums for the respective sample positions of the PRN code repetition period, and plays back at a substantially accelerated rate the sums stored in said storage device for the respective sample positions.

In accordance with another independent aspect of the invention, there is provided, in a system wherein an incoming signal is transmitted in successive PRN code repetition periods, an enhanced processor comprising a memory for accumulating digital samples of said signal, said samples being substantially identically positioned within respective ones of said periods; and playback apparatus for playing back the accumulated samples for each of said positions at a rate that is accelerated as compared to the rate at which said memory accumulates said samples.

The features of the present invention provide accelerated detection of signals and more accurate measurement after the signal is found.

BRIEF DESCRIPTION OF THE DRAWINGS

The above and numerous other objectives, features and advantages that may be achieved by the present invention may be more readily understood from the following detailed description by referring to the accompanying drawings, in which.

DETAILED DESCRIPTION OF THE INVENTION

In accordance with the invention there is provided an enhanced digital channel processor for a satellite positioning system receiver which includes a memory processor that accumulates samples that are substantially identically positioned within respective PRN code repetition periods. The memory processor plays back the accumulated sums for each code position at an accelerated rate.

The invention also provides a method of fast acquisition and measurement at a low SNR for a satellite positioning system receiver, which comprises the steps of accumulating samples that are substantially identically positioned within respective PRN code repetition periods, and playing back at a substantially accelerated rate the accumulated sums corresponding to each code position.

The invention is described below using a GPS receiver for L1 C/A-code as an example. The invention is equally applicable to other types of satellite positioning system receivers for C/A or other PRN codes, such as GLONASS and other spread spectrum-based systems. The frequencies and clock rates disclosed in the detailed embodiment are by way of an enabling example of the invention; they do not limit the invention as broadly conceived.

Figure 1:
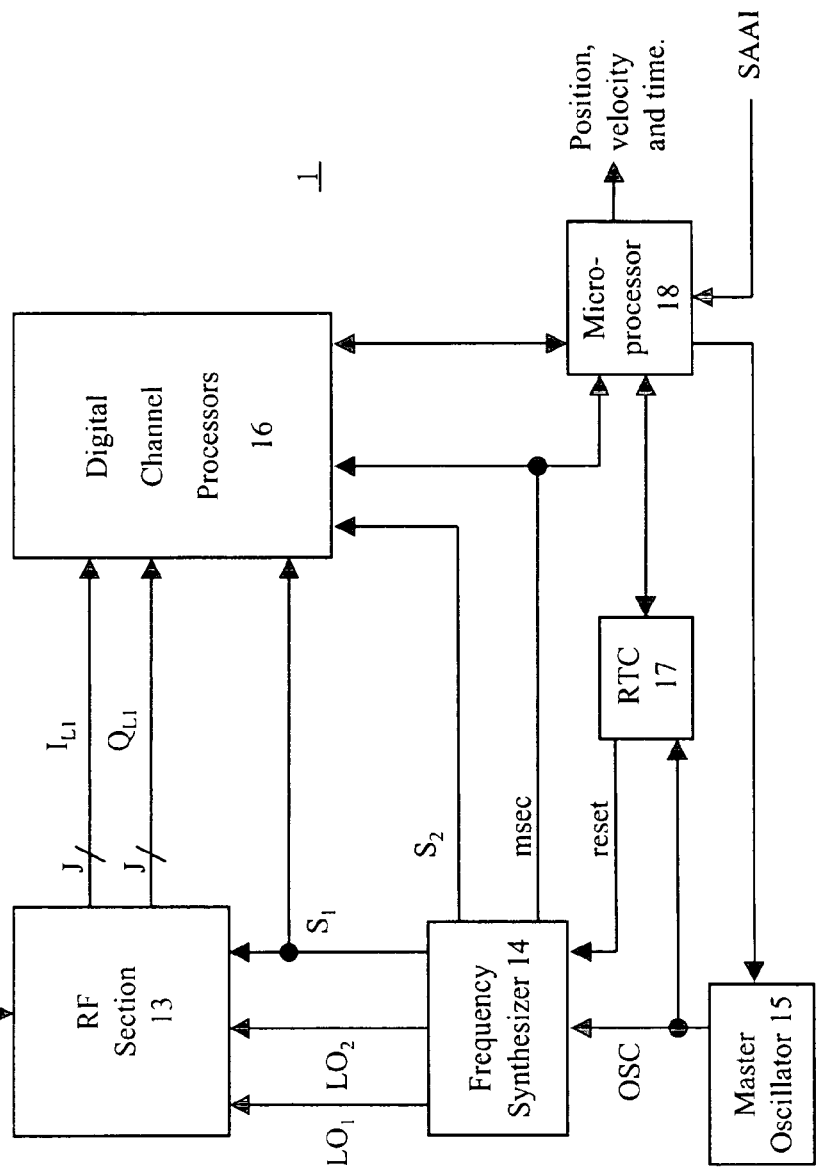
FIG. 1 is a high-level block diagram showing one embodiment of a GPS receiver which incorporates the present invention.

FIG. 1 shows an overview of one embodiment of a satellite positioning system receiver in accordance with the invention. GPS receiver 1 includes antenna 11, filter/LNA 12, RF section 13, frequency synthesizer 14, master oscillator 15, digital channel processors 16, Real Time Clock (RTC) 17 and microprocessor 18.

Antenna 11 provides a means of receiving the GPS L1 signal. Block 11 may comprise a patch antenna such as that described in U.S. Pat. No. 5,515,057, AGPS Receiver with N-Point Symmetrical Feed Double-Frequency Patch Antenna,@ issued to Lennen et al. Antenna 11 supplies signal L1_ANT to filter/LNA 12. Other antennas known in the art may be used as well. Filter/LNA 12 filters the incoming signal to remove out-of-band interference and then performs a low noise amplification designed to set the receiver's noise figure. Filter/LNA 12 supplies signal L1_RF to RF section 13.

RF section 13 provides further filtering and amplification, and also performs frequency translation, quantization and sampling. The quantized and sampled in-phase and quadrature signals ($I_{L1}$ and $Q_{L1}$) are supplied to digital channel processors 16.

Frequency synthesizer 14 provides a number of frequencies and clocks used throughout the receiver. Frequency synthesizer 14 itself is driven by signal OSC from master oscillator 15 (nominally 5 MHZ). All frequencies and clocks used by the receiver for frequency translation, local signal generation or measurement timing may be derived from the OSC signal. Frequency synthesizer 14 provides two local oscillator signals ($LO_1$ and $LO_2$), two sample clock rates ($S_1$ and $S_2$), and a 1 kHz timing signal (msec).

Master oscillator 15 may take the form, among others, of an XO (crystal oscillator), a TCXO (temperature controlled crystal oscillator) or a DCXO (digitally controlled crystal oscillator). Use of the DCXO has the advantage that the maximum oscillator frequency offset may be controlled by the microprocessor. This process and how it relates to the invention will be described below.

RTC 17 maintains receiver time and is driven from the OSC signal. RTC 17 may be used to maintain time when the rest of the receiver is powered OFF.

Digital channel processors (DCPs) 16 process the incoming samples ($I_{L1}$ and $Q_{L1}$) to facilitate satellite tracking, measurement processing and satellite data extraction. DCPs 16 comprise two types of tracking channels. DCPs of the first type, standard digital channel processor (SDCP), exist in the prior art and provide standard acquisition and tracking functionality. DCPs of the second kind, enhanced digital channel processors (EDCP), have additional circuitry for achieving improved SNR and fast acquisition performance. A channel, either EDCP or SDCP, is designed to search for a single satellite at any one time.

Figure 5:
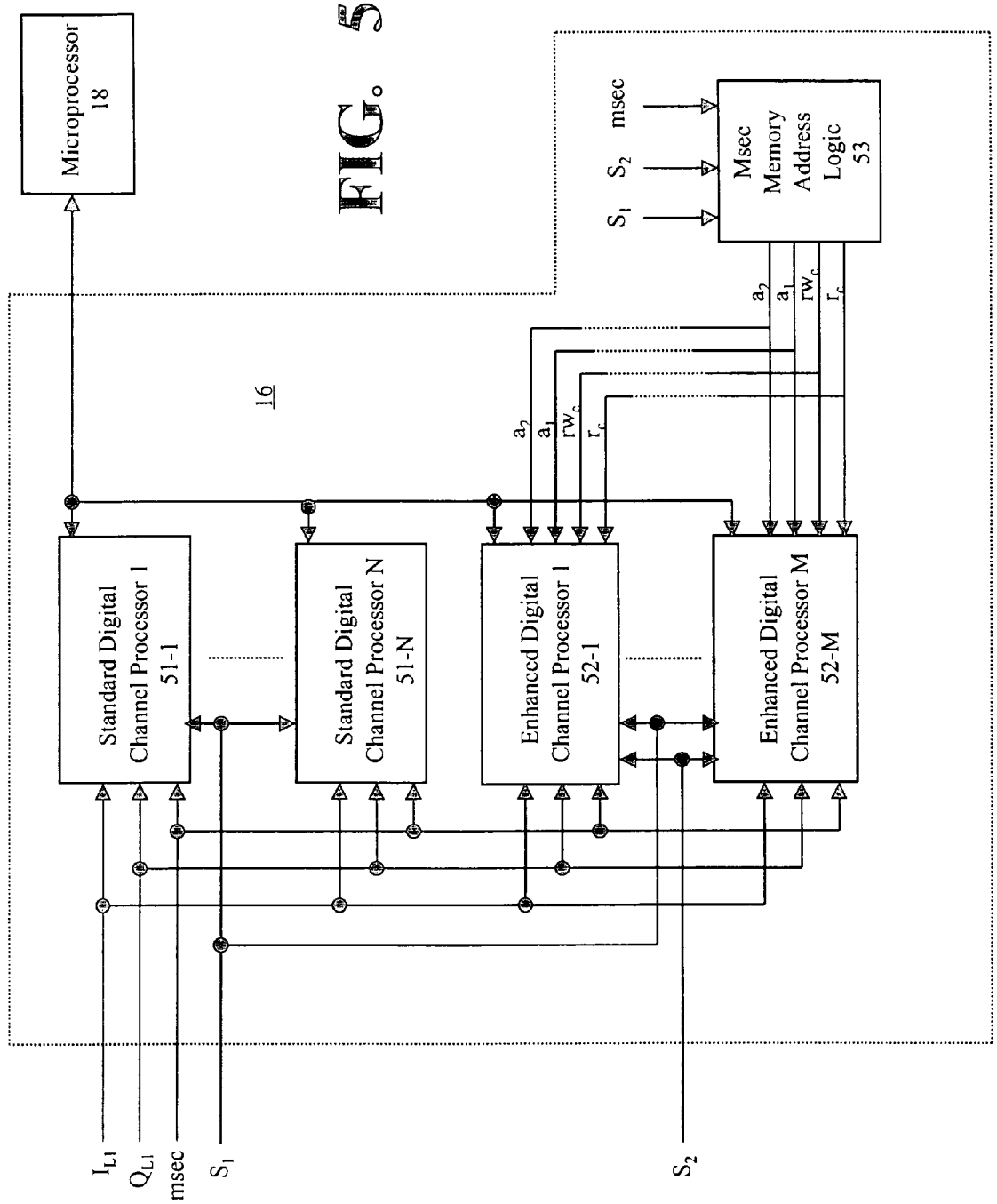
FIG. 5 is a schematic diagram of digital channels processors including a mix of standard digital channels processors and enhanced digital channels processors in a GPS receiver in accordance with the present invention.

As FIG. 5 shows, the receiver 16 employs not only EDCPs but also SDCPs. This minimizes the use of the extra hardware associated with the EDCP structure. As an example, a 16-channel receiver containing 12 SDCPs and 4 EDCPs allows a large number of channels for standard tracking operation together with enough EDCPs to achieve low SNR and fast acquisition when required. It is also important to note that an EDCP can achieve low SNR and fast acquisition and perform continuous tracking functions. The EDCP may be switched by the microprocessor between fast acquisition and continuous tracking modes.

DCPs 16 interact closely with microprocessor 18. Microprocessor 18 may perform many functions including controlling the acquisition and tracking processes, measurement processing, and receiving external Satellite Acquisition Aiding Information (SAAI). The SAAI may include any information which may be used by the receiver to reduce the time/frequency uncertainty window, including time and/or frequency information measured or otherwise obtained, as from a cell phone signal. Another example of SAAI is information regarding the SVs that are in view, which may be used to direct a channel to a satellite with a known azimuth (i.e., angular distance from north) and elevation (i.e. location above the horizon).

Filter/LNA

Figure 2:
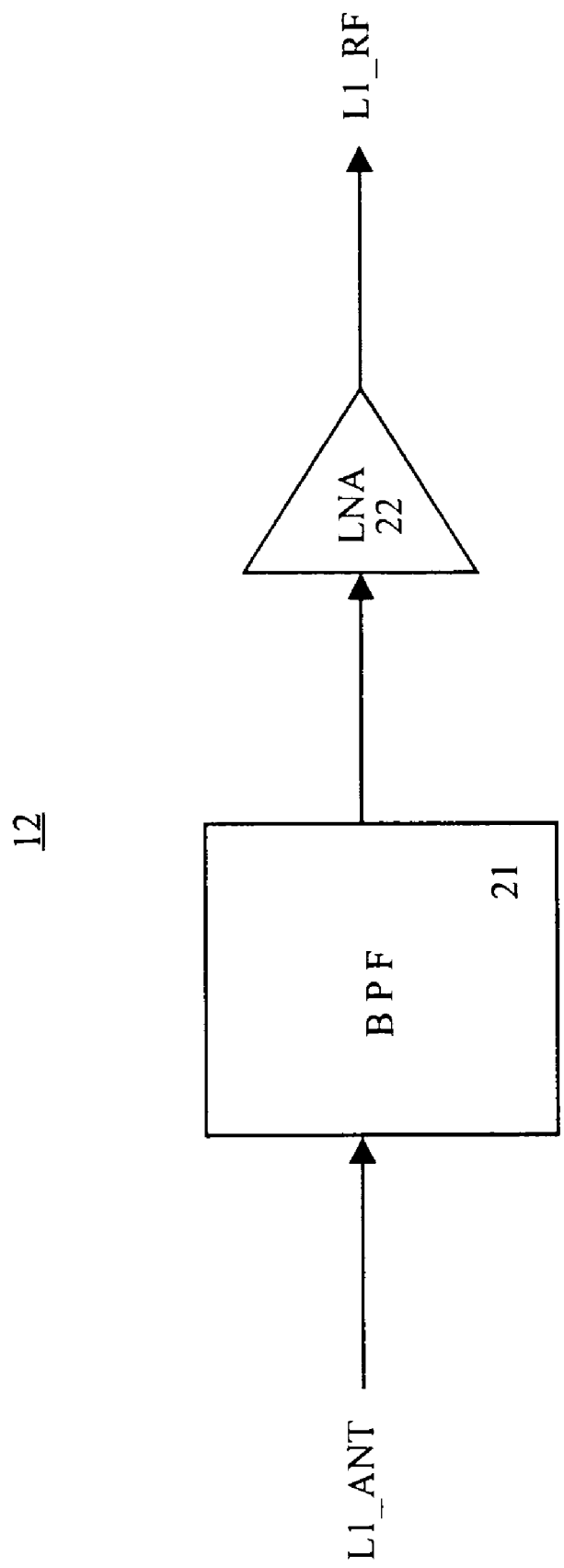
FIG. 2 is a block diagram of a filter/low-noise amplifier (LNA) in a GPS receiver in accordance with the present invention.

FIG. 2 shows details of a filter/LNA. Filter/LNA 12 comprises bandpass filter (BPF) 21 and LNA 22. Bandpass filter 21 filters the GPS L1 signal L1_ANT supplied by antenna 11. The nominal center frequency of bandpass filter 21 is the nominal L1 carrier frequency (1575.42 MHZ). The bandwidth of bandpass filter 21 may take on a number of values ranging from approximately 2 MHZ to 30 MHZ. 30 MHZ is the approximate bandwidth of the signal transmitted from GPS satellites. Operation of bandpass filter 21 at 30 MHZ encompasses a wideband mode (WB) which will be described in more detail below.

The output of bandpass filter 21 is amplified by LNA block 22. LNA block 22 typically has a noise figure (NF) of ~1 dB and a gain between 20 dB and 50 dB. The NF of LNA block 22 and in-band filter loss of bandpass filter 21 effectively sets the NF for the entire receiver. Low SNR and fast acquisition receiver operations are sensitive to receiver losses. The receiver's performance may be improved noticeably through a prudent selection of bandpass filter and LNA parameters to lower filter loss in bandpass filter 21 and reduce the NF of LNA 22.

RF Section

Figure 3:
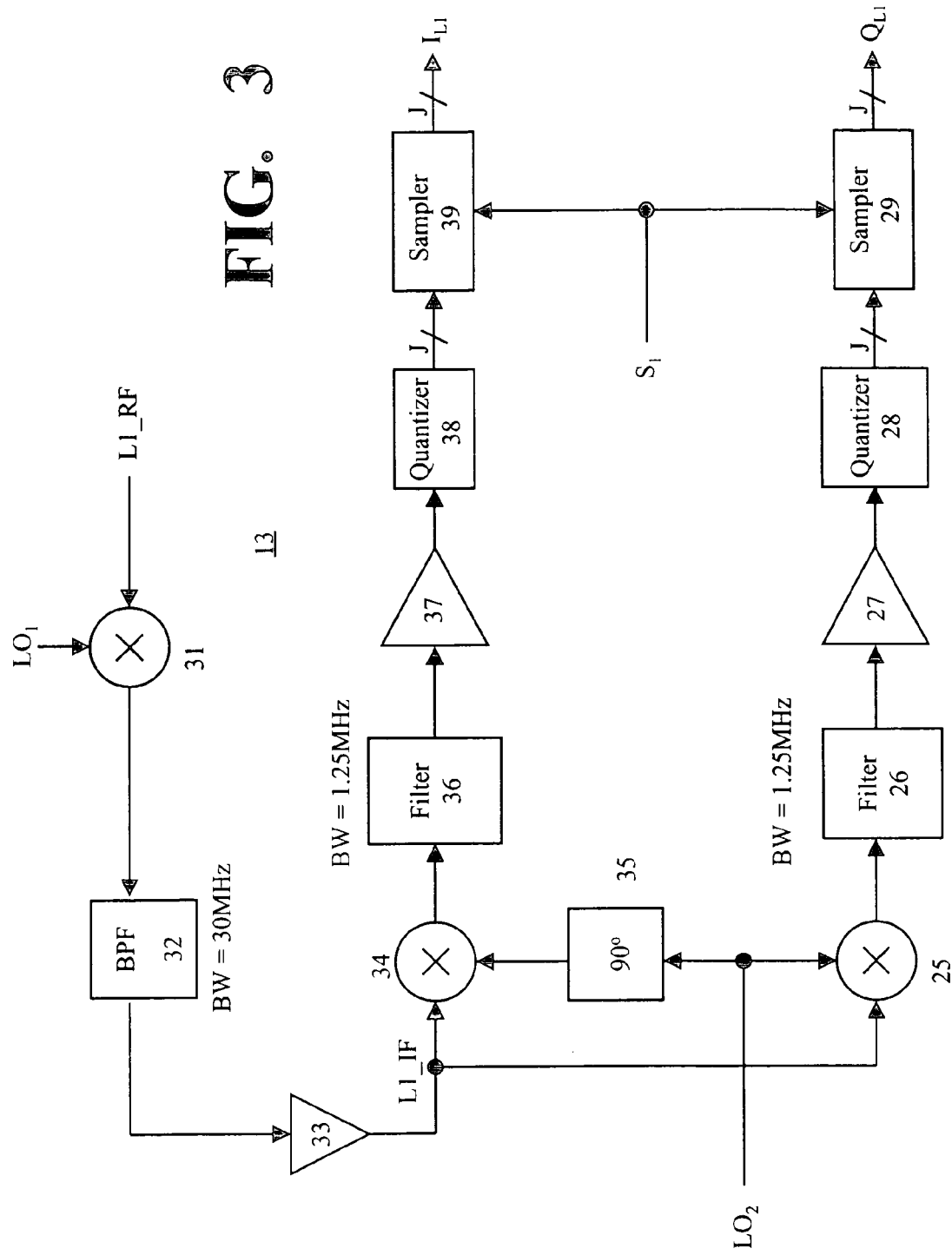
FIG. 3 is a block diagram of a radio-frequency section (RF section) in a GPS receiver in accordance with the present invention.

FIG. 3 shows details of an RF section 13. RF section 13 comprises mixer 31, bandpass filter 32, amplifier 33, phase shifter 35, mixer 34, filter 36, amplifier 37, quantizer 38, sampler 39, mixer 25, filter 26, amplifier 27, quantizer 28, and sampler 29. The input signal L1_RF (at 1575.42 MHZ) supplied by filter/LNA 12 (FIG. 1) is frequency translated by mixer 31 using local oscillator signal $LO_1$. The resulting output of mixer 31 is at a nominal frequency of 175.42 MHZ, and is filtered by filter 32 to remove the image frequency created during the mixing operation of mixer 31. Filter 32 may take the form of a surface acoustic wave (SAW) filter for optimal out-of-band interference rejection. The signal is further amplified by amplifier 33 before being supplied to mixers 34 and 25. Mixer 34 mixes the L1_IF signal supplied by amplifier 33 with the output of phase shifter 35. Phase shifter 35 creates a ninety-degree phase shifted version of local oscillator signal $LO_2$. The output of mixer 34 is an in-phase signal with a carrier that has been frequency translated to a nominal frequency of 420 kHz. The output of mixer 34 is filtered in filter 36 to remove the image frequency generated by mixer 34 and to provide a bandwidth compatible with the Nyquist sampling theorem. The output of filter 36 is further amplified in amplifier 37 before being quantized in quantizer block 38. The output of quantizer 38 is sampled in sampler 39. Sampler 39 operates at a rate determined by the $S_1$ clock signal (nominally 2.5 MHZ in this embodiment), which should be consistent with the Nyquist sampling requirement as pertaining to the PRN code information in the sampled signal.

The combination of mixer 25, bandpass filter 26, amplifier 27, quantizer 28 and sampler 29 operate identically to mixer 34, bandpass filter 36, amplifier 37, quantizer 38 and sampler 39, respectively, as described above, to produce the quadrature output signal $Q_{L1}$.

There are potential losses in filter 36, quantizer 38 and sampler 39. These losses directly impact the receiver's performance in terms of its ability to operate on low SNR signals and to perform fast acquisition. The bandwidth of filter 36 should not be made too narrow (e.g., <1 MHZ) as this results in a significant filtering loss SNR degradation. The number of bits used in the quantizer is also important. Quantization loss is well known in the art, as described, for example in AGlobal Positioning System: Theory and Applications,@ Volume 1, pages 717–771. Table 1 below shows the SNR loss for a number of quantization options. Also shown is the increase in integration time required to recover the loss, which demonstrates approximately the same performance as a quantizer with a very large number of bits and diminishing SNR loss.

TABLE 1

| Quantization Bits | SNR Loss (dBs) | Integration Time |
|---|---|---|
| 1 | 1.96 | 1.57 |
| 2 | 0.55 | 1.14 |
| 3 | 0.16 | 1.04 |

Many GPS receivers have been designed with 1-bit quantization for simplicity. The simplification impacts the quantizer design and the 'fan out' effect of bits in the DCPs. When seeking to optimize low SNR and fast acquisition modes, it is preferable to minimize receiver losses and their effects (as shown in the Integration Time column in Table 1). Hence, it is preferable in the current embodiment to use a multi-bit quantization. A good engineering trade-off between performance and complexity is to use 2-bit quantization. Two-bit quantization would be used in the preferred embodiment described herein, although FIG. 3 shows a generic J-bit quantization, and other multi-bit quantizations may be used. Signals $I_{L1}$ and $Q_{L1}$ output from the RF section are 2-bit quantized and sampled versions of the incoming frequency-translated in-phase and quadrature GPS L1 signal.

Frequency Synthesizer

Figure 4:
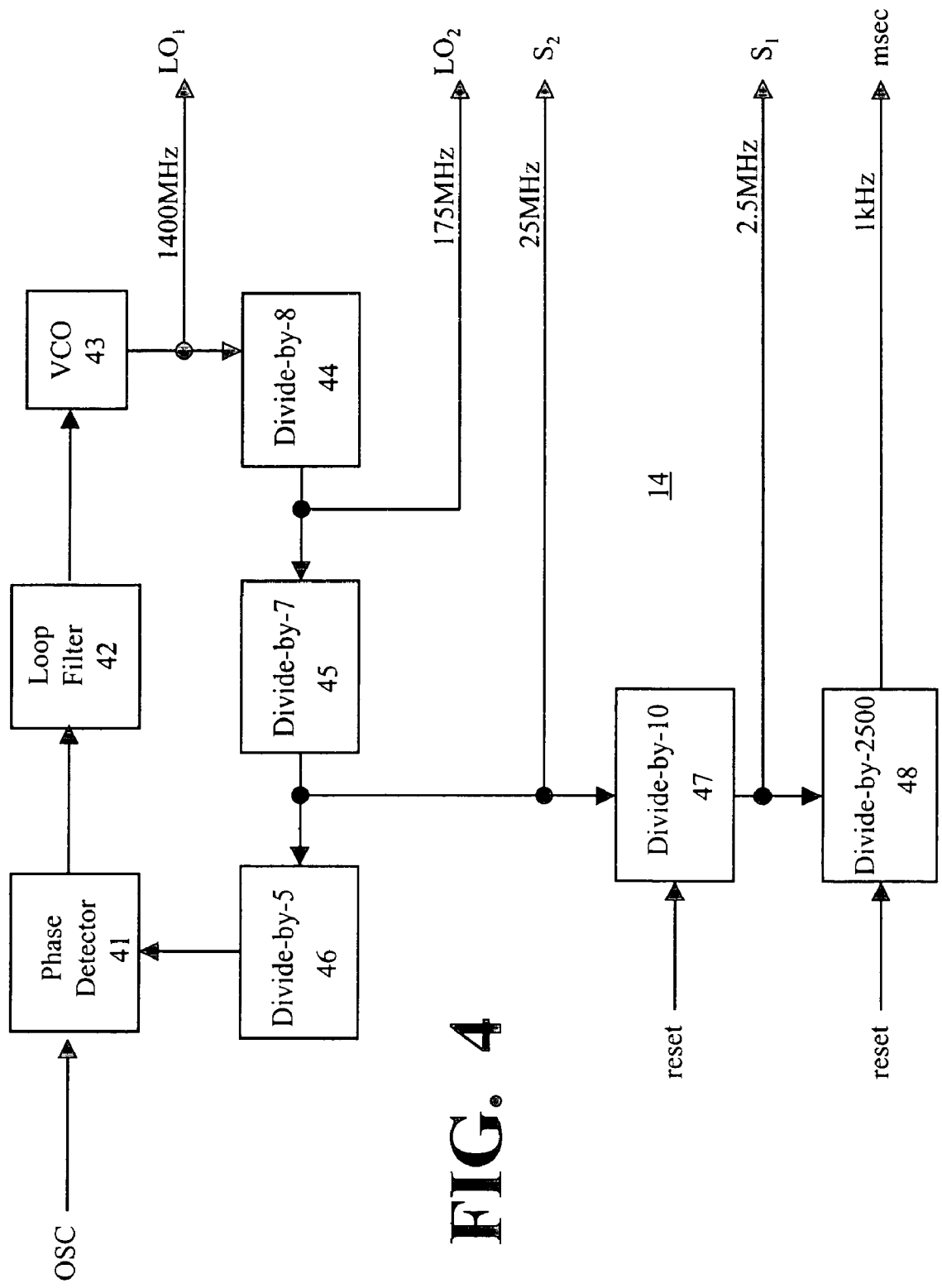
FIG. 4 is a block diagram of a frequency synthesizer in a GPS receiver in accordance with the present invention.

FIG. 4 shows details of a frequency synthesizer. Frequency synthesizer 14 comprises phase detector 41, loop filter 42, voltage controlled oscillator (VCO) 43, divide-by-8 block 44, divide-by-7 block 45, divide-by-5 block 46 divide-by-10 block 47 and divide-by-2500 block 48.

All output signals of frequency synthesizer 14 may be derived from the input signal OSC supplied by master oscillator 15. Phase detector 41, loop filter 42, VCO 43, divide-by-8 block 44, divide-by-7 block 45 and divide-by-5 block 46 form a phase locked loop. Output signals are tapped from various parts of the loop. The output of VCO 43 provides the $LO_1$ signal at a frequency of 1400 MHZ. The output of VCO 43 is divided by 8 to provide the $LO_2$ signal at a frequency of 175 MHZ. The output of divide-by-8 block 44 is divided by 7 to provide signal $S_2$ at a clock rate 25 MHZ. The output of divide-by-7 block 45 is supplied to divide-by-10 block 47 which provides the signal $S_1$ at a clock rate of 2.5 MHz. $S_1$ is further divided by 2500 to provide the signal msec at a clock rate of 1 kHz.

Divide-by-10 block 47 and divide-by-2500 block 48 are provided with a reset signal with which RTC 17 may synchronize these blocks with its knowledge of time, after the receiver is powered ON.

The $LO_1$ and $LO_2$ signals are used to frequency translate the incoming satellite signal in RF section 13. The msec signal is used by DCPs 16 as part of its timing for measurements. Clock signals $S_1$ and $S_2$ are also used by DCPs 16. Signal $S_1$ may be used for sampling the signal in RF section 13 and is used by the SDCPs. Signals $S_1$ and $S_2$ are both used by the EDCPs. The relative rates of $S_1$ and $S_2$ provide part of the speed gain when searching for signal power, as will be explained later.

Digital Channel Processors

FIG. 5 shows a mix of SDCPs and EDCPs in DCP block 16. DCP block 16 comprises N SDCPs and M EDCPs. DCP 16 also includes memory address logic 53 for providing addressing capability for the memory processor in each EDCP. Operation of memory address logic 53 is described below in connection with FIG. 6.

Msec Memory Address Logic

Figure 6:
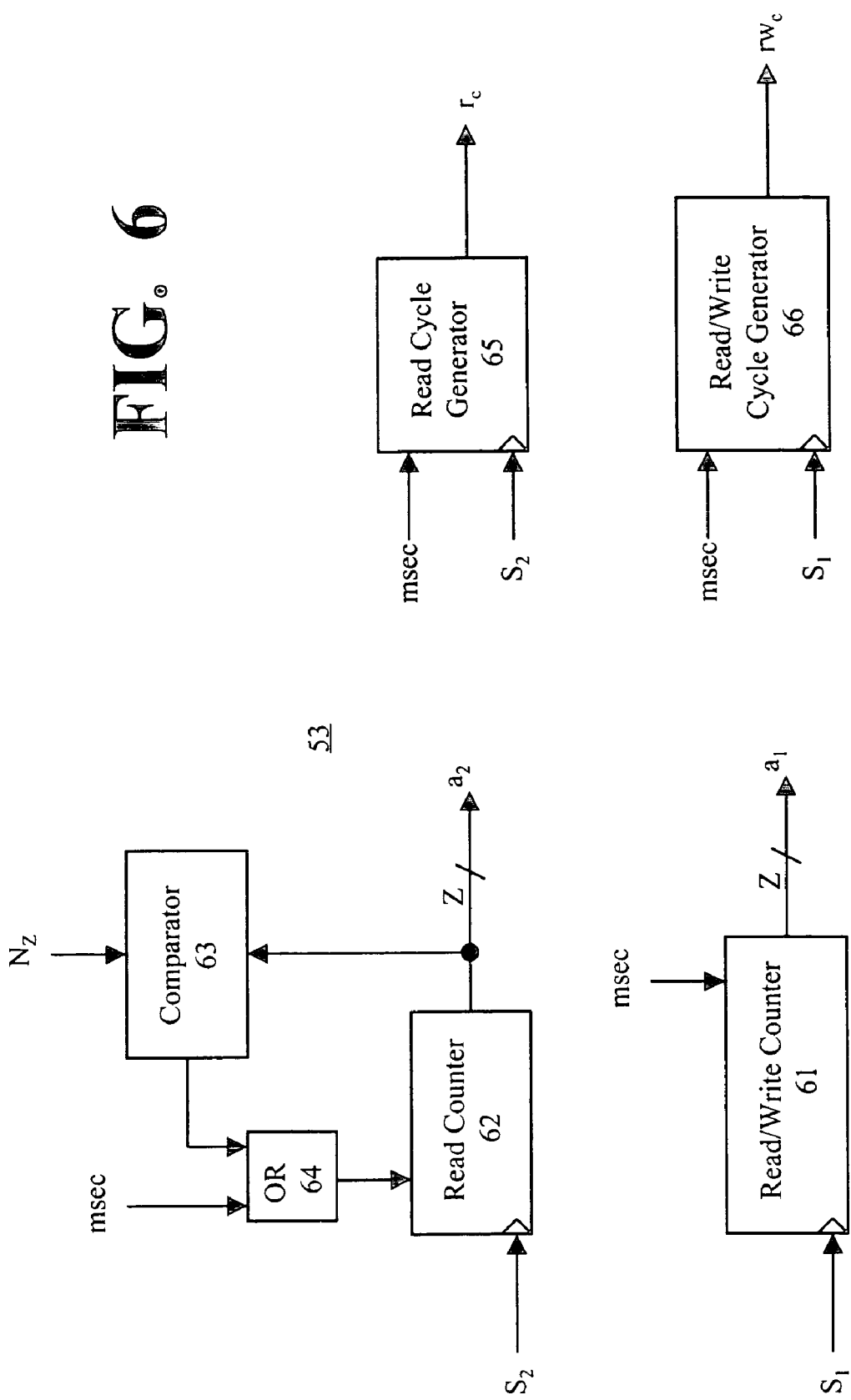
FIG. 6 is a block diagram of memory address logic in the digital channel processors shown in FIG. 5.

FIG. 6 shows details of memory address logic 53. Block 53 provides address lines and read/write cycle control for the memory processor of the EDCPs. Memory address logic 53 comprises read/write counter 61 for generating address signals $a_1$, read counter 62 for generating address signals $a_2$, comparator 63, OR-gate 64, read cycle generator 65 for generating read cycle signal $r_c$, and read/write cycle generator 66 for generating read/write cycle signal $rw_c$. Address lines $a_1$ and $a_2$ (Z bits wide covering the addressing range of the memory devices), and read/write cycle signals $r_c$ and $rw_c$ are synchronized to the msec signal. A separate memory processor in each EDCP a selects a particular msec signal to start its 20 msec integration.

Fast memory read operation is controlled by address lines $a_2$ and read cycle signal $r_c$. For clock signal $S_2$=25 MHZ and clock signal $S_1$=2.5 MHZ, address lines $a_2$ cycle through their range of values 10 times per msec cycle. Depending on how the memory cycles are set up for a particular memory device, read cycle signal $r_c$ may just be a constant value which places the memory in read mode.

The read/write operation performed when accumulating over 20 msecs is controlled by address lines $a_1$ and read/write cycle signal $rw_c$. Address lines $a_1$ cycles through their range of values (for example 0 through 2499) once every msec cycle. The read/write cycle signal $rw_c$ provides the ability to read a value and then write the accumulation of that value with the incoming signal back into the same memory location. The exact structure of $rw_c$ depends on the type of memory being used. Signal NZ is the maximum address value (e.g., NZ=2499) and is compared with address lines $a_2$ by comparator 63. When address lines $a_2$ equal maximum value NZ, read counter 62 is reset.

Standard Digital Channel Processor

Figure 7:
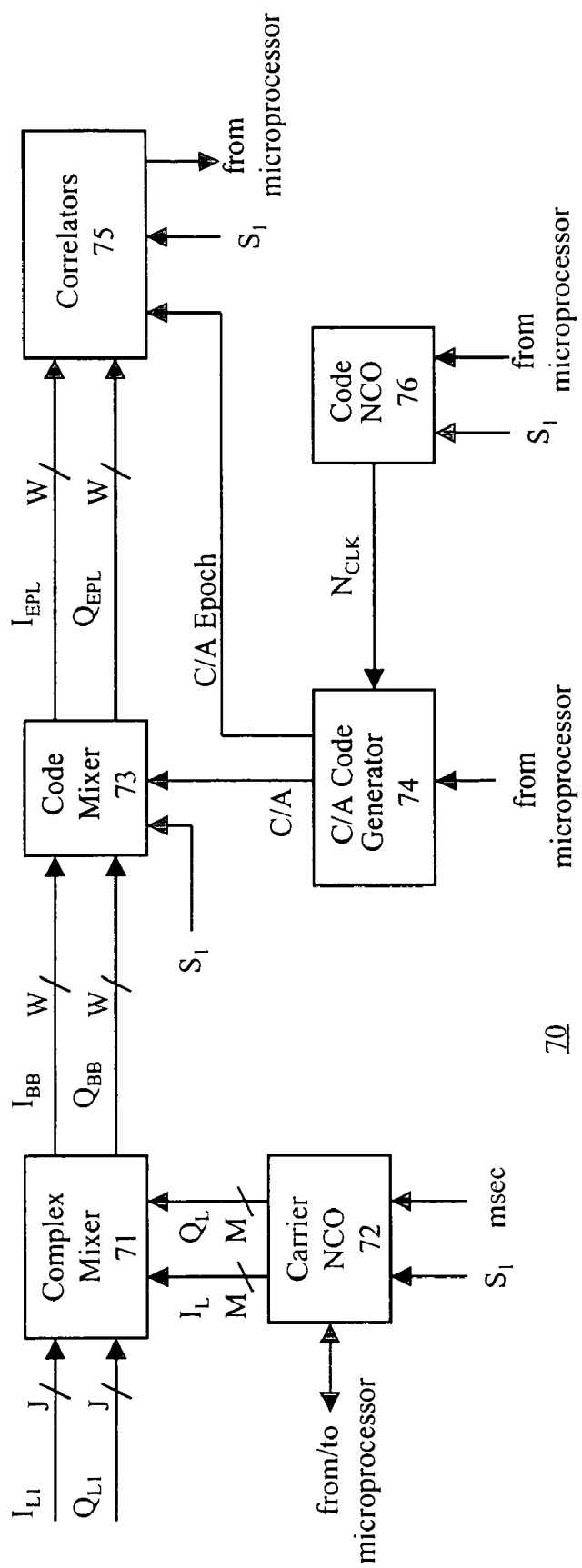
FIG. 7 is a block diagram of a standard digital channel processor shown in FIG. 6.

FIG. 7 shows details of a standard digital channel processor. Operations of SDCPs are well known in the art and are described in, for example, U.S. Pat. No. 5,541,606, AW-Code Enhanced Cross Correlation Satellite Positioning System Receiver,@ issued to G. R. Lennen, which is incorporated by reference herein. A brief description of SDCPs in connection with FIG. 7 will also be provided below.

SDCP 70, which represents any of SDCPs 51-1 to 51-N (FIG. 5), comprises complex mixer 71, carrier NCO 72, code mixer 73, C/A code generator 74, correlators 75 and code NCO 76. Input samples $I_{L1}$ and $Q_{L1}$ (both J-bit quantized) supplied by RF section 13 are frequency translated to baseband signals $I_{BB}$ and $Q_{BB}$ (both W-bit) by complex mixer 71. Carrier NCO 72 provides to complex mixer 71 in-phase and quadrature local oscillator signals $I_L$ and $Q_L$ (both M-bit) which match the expected carrier frequency present in samples $I_{L1}$ and $Q_{L1}$ Complex mixer 71 performs the following operations:

$I_{BB}=I_{L1} \times I_L + Q_L \times Q_{L1}$ $Q_{BB}=Q_{L1} \times I_L - I_{L1} \times Q_L$ The output signals $I_{BB}$ and $Q_{BB}$ represent in-phase and quadrature signals, respectively, with the carrier substantially removed. When searching through possible carrier frequency bins, the receiver's uncertainty in carrier frequency is manifested in the frequency offset between the pair of $I_{L1}$, $Q_{L1}$ signals and the pair of $I_L$, $Q_L$ samples. Signals $I_{BB}$ and $Q_{BB}$ are further processed by code mixer 73, which compares the incoming samples with delayed versions of the locally generated C/A code (usually at times that are early, punctual and late with respect to the incoming satellite C/A code). C/A code generator 74 provides the locally generated C/A code and a C/A Epoch signal. The C/A Epoch signal repeats at a nominal 1 kHz rate (i.e. C/A code repetition rate) and is fed into correlators 75. Both C/A code generator 74 and C/A Epoch signal timing are known in the art, as described in, for example, AGPS Interface Control Document ICD-GPS-200,@ published by Rockwell International Corporation, Satellite Systems Division, Revision B-PR, Jul. 3, 1991. Correlators 75 accumulate the correlations between local and incoming signals across a period defined by an integer multiple of the C/A Epoch period. C/A Code generator 74 is driven by a signal $N_{CLK}$ provided by code NCO 76. The $N_{CLK}$ signal is at a nominal clock rate of 1.023 MHZ.

The outputs of correlators 75 are read by microprocessor 18 at a rate defined by an integer multiple of the C/A Epoch period. Microprocessor 18 uses the correlator values to perform a number of functions, including closing code and carrier tracking loops, and extracting a satellite's 50 Baud data message. Microprocessor 18 feeds back its filtered estimate of the error in the carrier phase locked loop to the input of carrier NCO 72. Microprocessor 18 feeds back its filtered estimate of the error in the code tracking loop to the input of code NCO 76.

The number of correlators in correlators 75 is by definition the number of accumulators that microprocessor 18 can read. Increasing the number of accumulators allows a faster signal search rate. As an example, assume that the correlators block of an SDCP contains 4 correlators, two I and two Q correlators. Power is detected in the combination of I and Q as follows for a particular pair of accumulators n.

Signal Power=$(I_n)^2+(Q_n)^2$

This signal power estimate is compared with a threshold, above which a positive signal power detection is declared. Assume power detection requires a signal integration period of 20 milliseconds, carrier frequency uncertainty is 1 kHz (providing 40×25 Hz carrier bins), and time is known within an accuracy of 100 microseconds (providing 205×0.5 chip code phase bins). The total number of bins to search is therefore 40×205=8,200. The four accumulator correlators can search 1 carrier frequency bin and two code phase bins every 20 milliseconds. Hence, the maximum search time under these circumstances is as follows:

Maximum search=8,200×0.02/2=82 seconds

The example described above demonstrates an unacceptable search time for many applications. The invention described herein helps alleviate this problem.

Enhanced Digital Channel Processor

Figure 8:
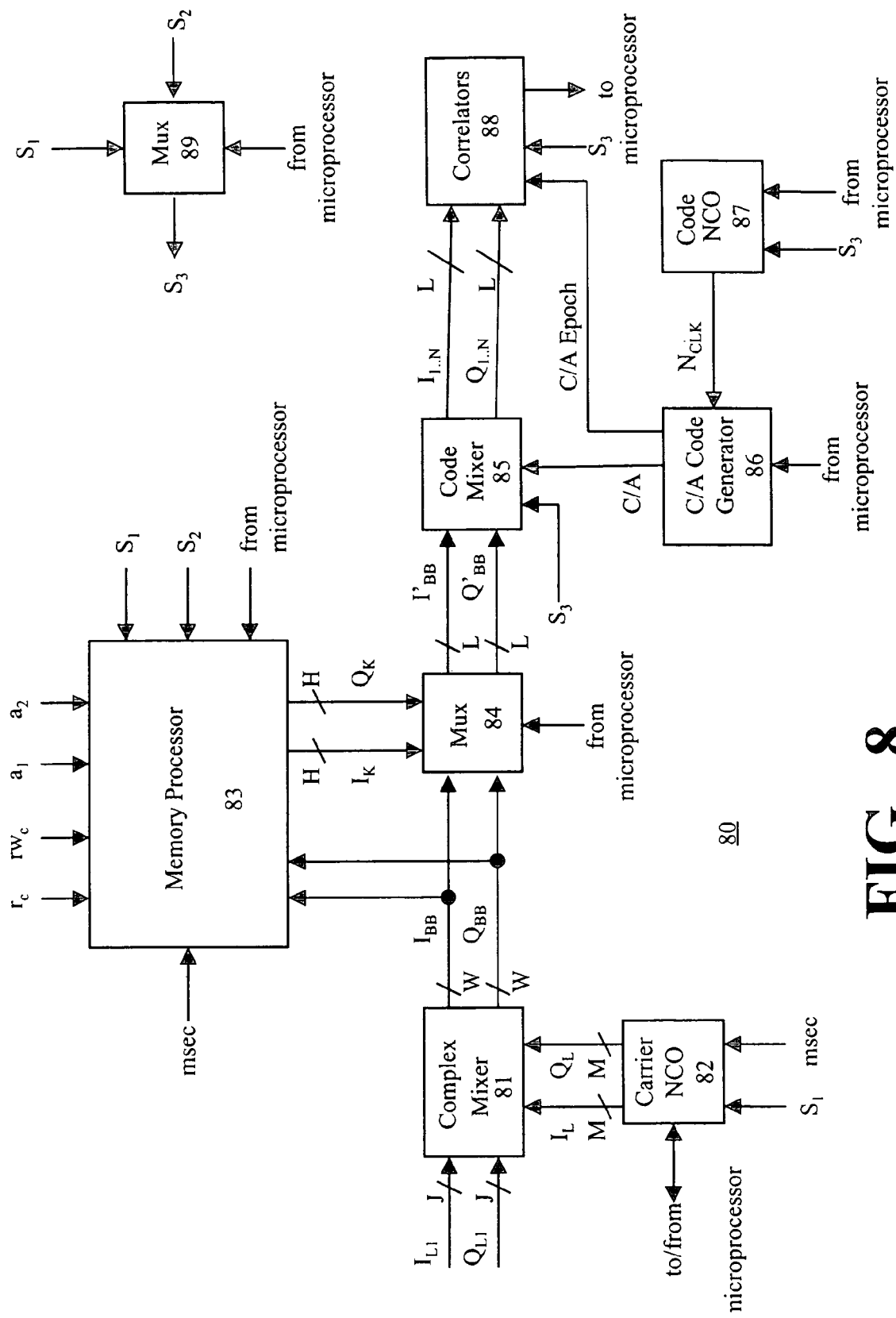
FIG. 8 is a block diagram of an enhanced digital channel processor in a GPS receiver which is in accordance with the present invention.

FIG. 8 shows details of one embodiment of an enhanced digital channel processor in accordance with the present invention. EDCP 80, which represents any of EDCPs 52-1 to 52-M (FIG. 5), comprises complex mixer 81, carrier NCO 82, memory processor 83, Mux 84, code mixer 85, C/A code generator 86, code NCO 87, correlators 88 and multiplexor or Mux 89.

Input signal samples ($I_{L1}$, $Q_{L1}$) are processed by complex mixer 81, in a manner similar to the operation of mixer 71 described above, along with in-phase and quadrature local oscillator signal $I_L$, $Q_L$ supplied by carrier NCO 82. The output signals $I_{BB}$, $Q_{BB}$ supplied by complex mixer 84 are further processed by memory processor 83 and Mux 84. Mux 84, under control of the microprocessor, selects either the $I_{BB}$, $Q_{BB}$ signals or $I_K$, $Q_K$ signals as its output. When operating in normal mode (i.e., not low SNR or fast acquisition) the outputs $I'_{BB}$, $Q'_{BB}$ come from the signals $I_{BB}$, $Q_{BB}$, and circuitry in memory processor 83 may be powered down to save battery usage. This mode is equivalent to continuous tracking using an SDCP (i.e. when signal location is already known).

Mux 89 is used to select the form of clock $S_3$ under the control of the microprocessor. There are two choices: $S_1$, a slow clock of 2.5 MHZ; and $S_2$, a fast clock of 25 MHZ. Code mixer 85, correlators 88 and code NCO 87 are driven from clock $S_3$. When running in normal mode, $S_3$ takes the form of the slow clock. When running in low SNR/fast acquisition mode, $S_3$ takes the form of the fast clock.

Carrier NCO 82 is used to select the carrier frequency bin to search. The combination of memory processor 83 and fast playback circuitry embodied in code mixer 85, correlators 88, C/A code generator 86 and code NCO 87 provides the rapid code phase search process. Memory processor 83 accumulates samples that are identically positioned within the code epoch period in the incoming C/A code. GPS data bits are 20 msecs long and hence this summation may be done over a 20 msec period (or longer integration period if data bit transitions are known). This technique relies on the C/A code repetition period of one msec (i.e. rate of 1 kHz). The 20 msec summations ($I_K$, $Q_K$) of the incoming signal are then played back at the faster clock rate through the code correlation circuitry. Memory processor 83 increases the effective code search rate by a factor of 20, and the code correlation circuitry increases it independently by a factor of 10, to provide an improvement by a factor of 200 in code phase search rates. These numbers are exemplary. If the memory processor accumulates for longer, 100 msecs instead of 20 msecs for example, and the playback fast clock rate is increased, further improvement may be achieved. For example, accumulating over 100 msecs and playing back at 100 MHZ instead of 25 MHZ improves the search rate by a factor of 4,000.

Accumulating for periods longer than 20 msecs in the memory processor may require knowledge of data bit transitions. This information may be provided either by an external source (e.g., via a communication link), by estimation, or from previous SV data knowledge gained while locked to the SV. The estimation technique will be described in more detail below.

FIG. 8 also shows that the EDCP has a greater number of code correlation positions than the SDCP has. Code mixer 85 outputs signals ($I_{1...N}$, $Q_{1...N}$) Signal $I_{1...N}$ represents N time-delayed comparisons between the incoming C/A code and the locally generated C/A code for the in-phase signal ($Q_{1...N}$ is the quadrature equivalent). N accumulators are required in correlators 88 for each of I and Q. Increasing the number of correlators from 4 (as in the SDCP) to 8 would allow a signal search at twice the rate. This may be used in conjunction with memory processor 83 and fast playback technique to further improve the search speed for both low SNR and fast acquisition requirements.

The signals $I_K$ and $Q_K$ need not maintain all the bits acquired during the accumulation process of the memory processor. For example, if J=2, M=2, W=3 and the memory processor accumulates for 20 msecs, $I_K$ and $Q_K$ may be 7 bits each. To minimize hardware in code mixer 85 and correlators 88, the number of bits in $I_K$ and $Q_K$ may be reduced to 3 bits (same as W) with only a small loss in SNR by intelligent choice of bit thresholds. This process will be described in more detail later.

Following the search example described above in connection with the SDCP, the EDCP is used to search the 8,200 bins using 4 correlators. The EDCP searches 1 carrier frequency bin and (20×10=) 200 code phase bins every 20 msecs. Hence, the total search time for the EDCP is approximately given by:

Maximum search=8,200×0.02/(2×200)=0.41 seconds

This represents a significant improvement over the prior art.

Memory Processor Block

Figure 9:
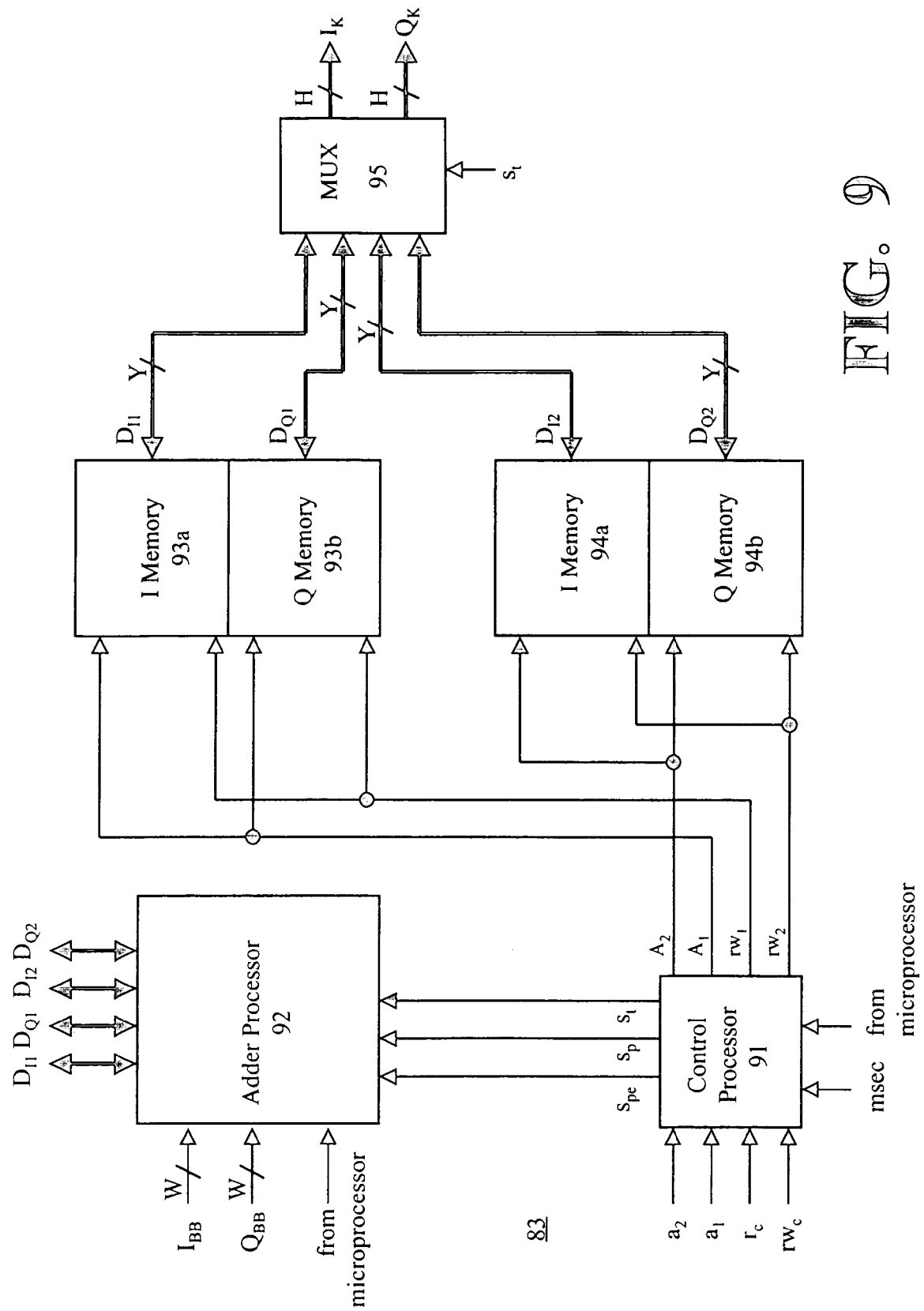
FIG. 9 is a block diagram of a memory processor in the enhanced digital channel processor shown in FIG. 8 which is in accordance with the present invention.

FIG. 9 shows more details of a memory processor 83. Memory processor 83 comprises control processor 91, adder processor 92, two pairs of basic memory blocks I Memory 93a, Q Memory 93b and I Memory 94a, Q Memory 94b, and MUX 95. I Memory 93a and Q Memory 93b form a memory pair that undergoes identical addressing modes. For example, they my be driven from the same address A, and they may both be in read only cycle at the same time. I Memory 94a and Q Memory 94b form the other memory pair.

Typically, when one of the memory pairs is being written to, the other memory pair is being read back into the fast playback correlation process. While the memory pair that is being written to operates at the slow clock rate, the memory that is being read from would be operating at the fast clock rate. This buffering process allows the last 20 msec memory accumulation to be processed by the fast correlators while the next 20 msec memory accumulation is being collected. Each of the memory devices (I Memory 93a, Q Memory 93b, I Memory 94a, Q Memory 94b) contains enough storage space for all input samples during a one msec period. When a 2.5 MHZ slow clock is used, this leads to storage of 2500 words for each of the memory devices. The width of each word in storage would be dependent on the number of bits in the input signal ($I_{BB}$, $Q_{BB}$) and the period over which the accumulation is to take place. A memory word width of Y bits is shown in FIG. 9.

The physical memory type used in the memory processor may be one of a variety of different types. Examples include static RAM (SRAM) and dynamic RAM (DRAM). Depending on the state of the art in memory devices, SRAM may be faster (allowing higher clock rates), while DRAM may use less surface area in an integrated circuit and may be cheaper. Other memory devices may be used. The main requirement is that the memory device may play back at an accelerated rate.

Addressing modes for the memory devices are controlled via control processor 91. Block 91 receives inputs $a_1$, $a_2$, $r_c$ and $rw_c$ (generated by memory address logic block 53 shown in FIGS. 5 and 6), and outputs addresses $A_1$ and $A_2$ and memory cycle control signals $rw_1$ and $rw_2$. The signals $a_1$, $a_2$, $r_c$ and $rw_c$ apply to all channels. The signals $A_1$, $A_2$, $rw_1$ and $rw_2$ apply to a specific EDCP channel.

Figure 10:
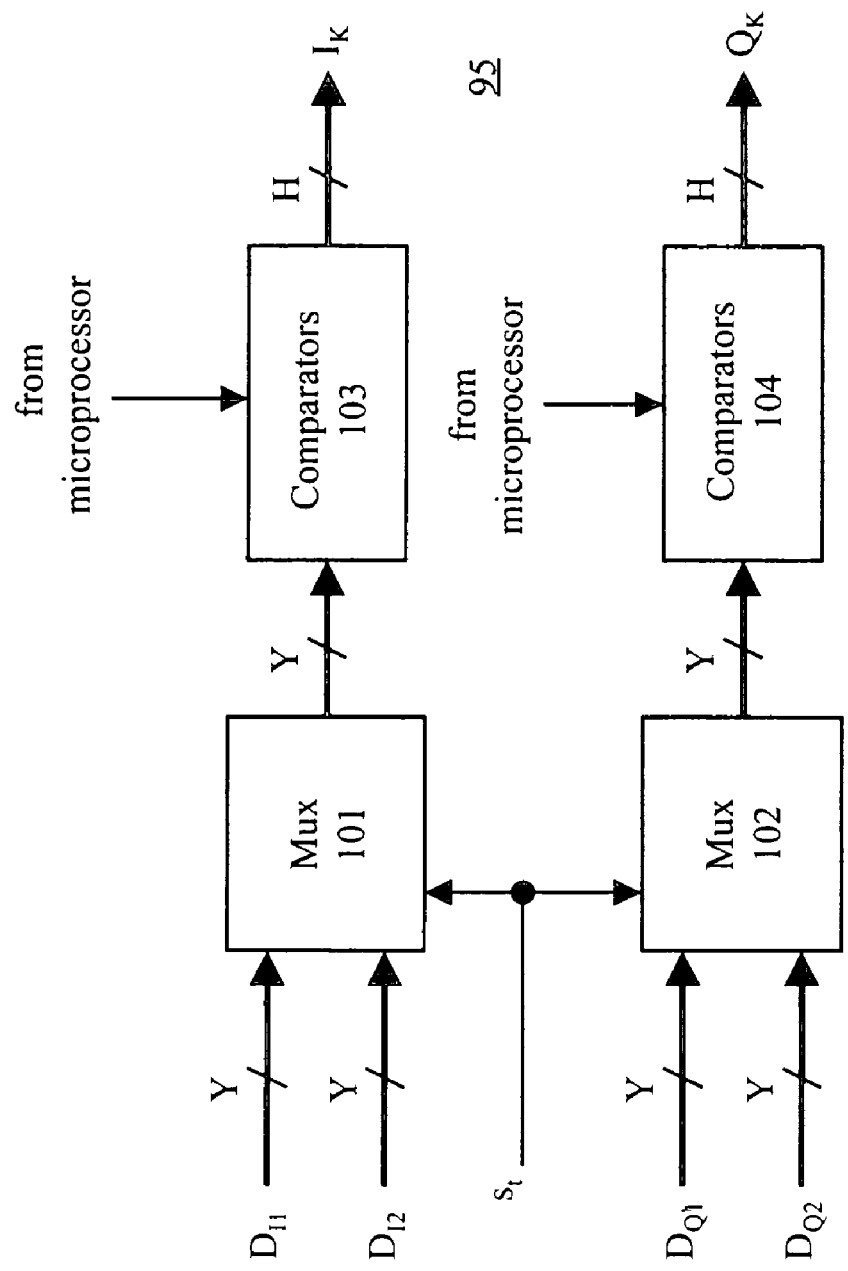
FIG. 10 is a block diagram of a multiplexor in the memory processor shown in FIG. 9.

FIG. 10 shows MUX 95 in more detail. Block 95 comprises multiplexors Mux 101 and Mux 102, comparators 103 and comparators 104. The multiplexors are used to select which data buses (memory pair 1 or 2) are directed to the output of MUX 95 (FIG. 9). The $s_t$ signal toggles back and forth between driving memory blocks 1 and 2. The outputs of Mux 101 and Mux 102 are supplied to the inputs of comparators 103 and comparators 104, respectively. The purpose of the comparators is to reduce the number of bits (H) in the outputs ($I_K$, $Q_K$) from the Y-bit inputs. The microprocessor provides an input for each bit on the output. For example, if Y=7 and H=3, then the sign bit from Y, Y having a range +/−64, may be maintained as the most significant bit of H, a second bit of H may be formed by comparing the magnitude of Y with the value 42, and a third bit of H may be formed by comparing the magnitude of Y with the value 20.

Alternatively, a less complex circuit that only selects the top N-bits of the Y-bit number, may be used. The advantage of the more complex circuit is that it is more optimal in terms of reducing signal to noise ratio loss when reducing the number of output bits.

Adder Processor Block

Figure 11:
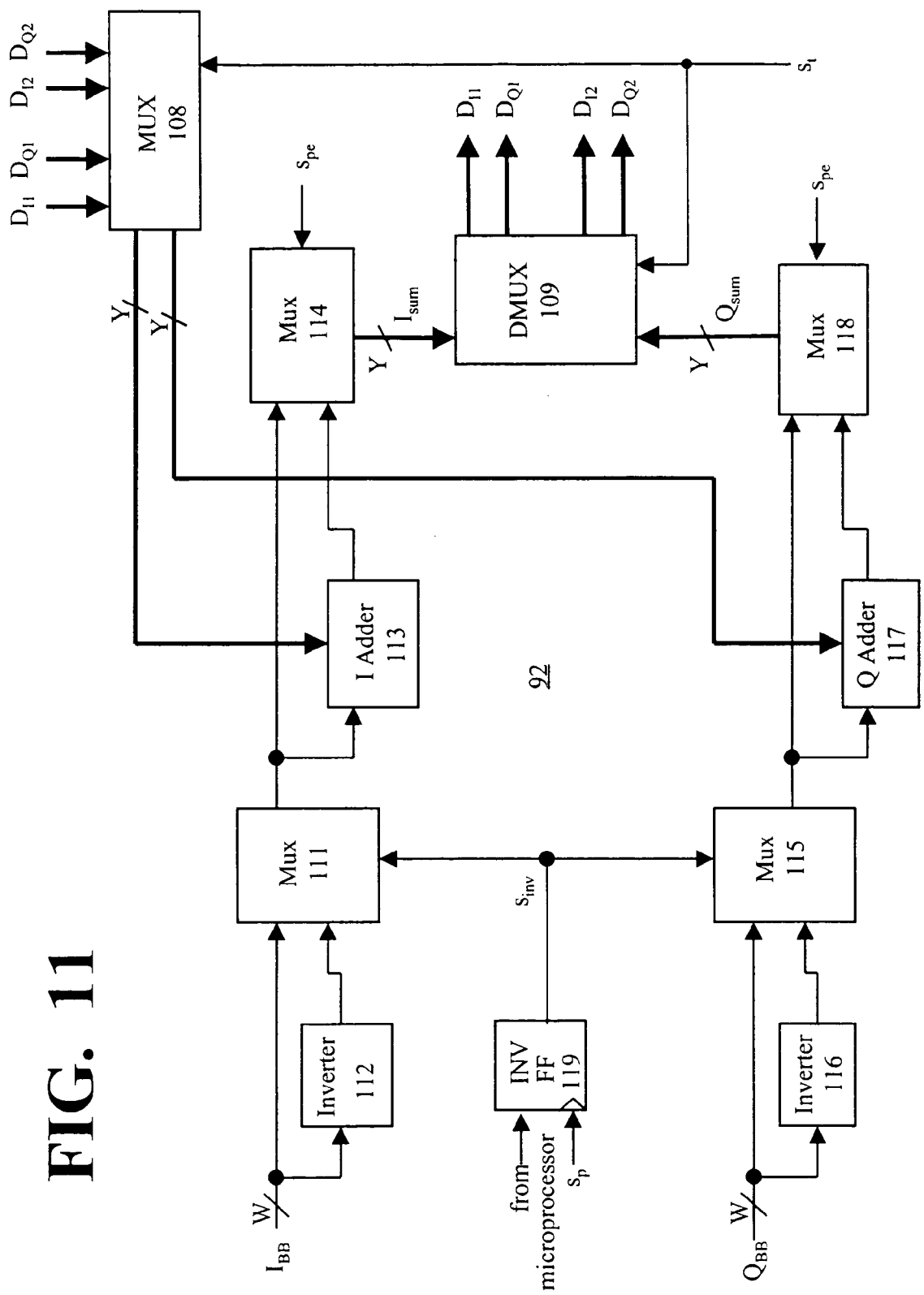
FIG. 11 is a block diagram of an adder processor in the memory processor shown in FIG. 9.

FIG. 11 shows more details of an adder processor 92 of FIG. 9. Adder processor 92 comprises Mux 111, inverter 112, adder 113, Mux 114, Mux 115, inverter 116, adder 117, Mux 118, flip-flop INV FF 119, MUX 108 and demultiplexor or DMUX 109. The incoming digitized sample streams ($I_{BB}$, $Q_{BB}$) are supplied to Mux 111 and Mux 115, respectively. The sample streams also pass through respective inverters 112 and 116 which provide inverted versions of respective sample stream ($I_{BB}$, $Q_{BB}$) at their outputs. Mux 111 and Mux 115, therefore, both have the data streams and inverted data streams as their inputs. The signal $s_{inv}$ selects one set of inputs to be passed to the outputs of Mux 111 and Mux 115. INV FF 119 is a flip-flop that is clocked by the signal $s_p$ so that a value provided by the microprocessor is latched to form signal $s_{inv}$ at the start of each 20 msec memory accumulation period. The signal $s_{inv}$ then determines whether the outputs of Mux 111 and Mux 115 are inverted or non-inverted versions of the incoming signal streams $I_{BB}$, $Q_{BB}$. Through this mechanism the data bit transitions can be accounted for, so that longer integration periods (e.g., 100 msecs) may be accommodated.

The select lines of Mux 114 and Mux 118 are each coupled to signal $s_{pe}$, so that during the first millisecond of a particular satellite's integration period the outputs are taken from the outputs of Mux 114 and Mux 118, respectively. This allows the first value loaded into memory to be initialized, rather than accumulated with a previously stored memory value. Some memory devices have this initialization mode built in and hence can use the signal $s_{pe}$ directly, without requiring Mux 114 or Mux 118.

MUX 108 selects the memory data paths from memory pair 1 or 2, according to the $s_t$ signal supplied to its select input. Each 20 milliseconds the outputs of MUX 108 toggle between memory pairs 1 and 2.

During each $S_t$ sample clock period, except during the first millisecond of an integration period, the value currently stored in the memory pair that is being written to is read and accumulated in I Adder 113 (and similarly in Q Adder 117) with the incoming signal sample value, i.e. output of Mux 111 and Mux 115. The outputs of Mux 114 and Mux 118 ($I_{sum}$ and $Q_{sum}$) are then written back into the memory address. DMUX 109 selects the data bus, memory pair 1 or 2, to which $I_{sum}$ and $Q_{sum}$ is passed according to the integration period toggle signal $s_t$.

Adder processor 92 is used during the memory write phase of operation which is performed at the slow sample clock rate of $S_1$. If 20 milliseconds is the longest integration time required then Mux 111, Mux 115, INV FF 119, inverter 112 and inverter 116 may be eliminated.

Control Processor

Figure 12:
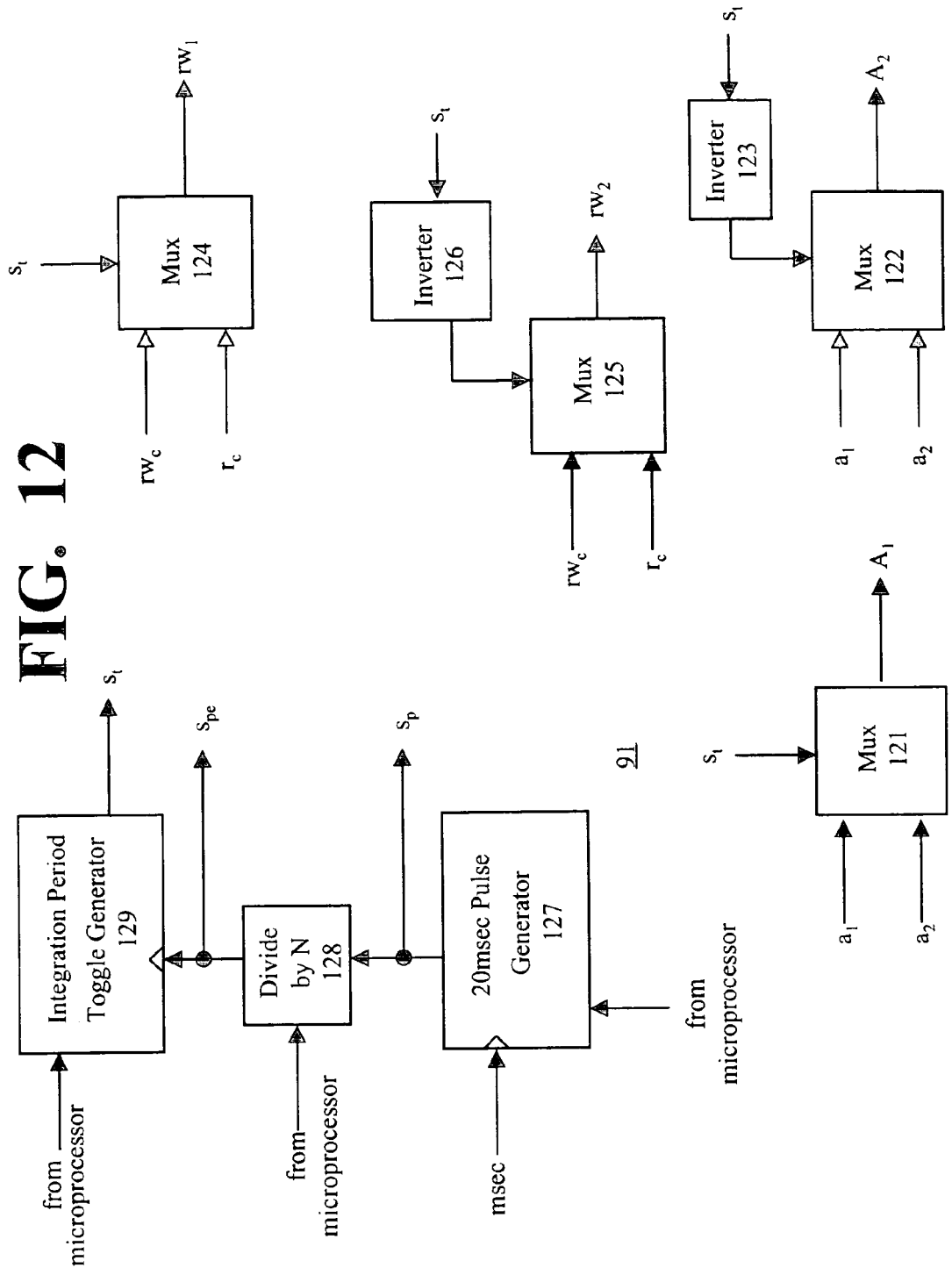
FIG. 12 is a block diagram of a control processor in the memory processor shown in FIG. 9.

FIG. 12 shows a control processor 91 (FIG. 9) in more detail. Control processor 91 comprises Mux 121, Mux 122, inverter 123, Mux 124, Mux 125, inverter 126, pulse generator 127, Divide-by-N 128 and integration period toggle generator 129. There is one control processor 91 per EDCP channel. The purpose of the control processor is to allow a particular channel to synchronize the address and read/write cycle signals to the millisecond that lines up most accurately with a particular satellite's 50 Baud data bit edge. Local (one channel only) address lines $A_1$, $A_2$ are extracted from global (i.e. sent to all EDCP channels) address lines $a_1$ and $a_2$. This selection process is performed using Mux 121 and Mux 122. When $A_1$ is used for the write memory mode, $A_2$ is used for the read memory fast playback mode. The integration period toggle signal $s_t$ is used to select the mode for which $A_1$ and $A_2$ would be used during any integration period. The read/write cycle that a memory pair is in during any integration period is similarly selected via Mux 124 and Mux 125. Inverter block 123 places the output of Mux 122 in a state opposite to that of Mux 121. Similarly, invert block 126 places the output of Mux 125 in a state opposite to the state of Mux 124.

Pulse generator 127 clocked by signal msec (the particular msec being selected by the microprocessor) generates an output signal $s_p$ which further drives Divide-by-N block 128, which in turn drives integration period toggle generator 129. The microprocessor selects the initial state of pulse generator 127 and toggle generator 129 (via their reset inputs), which selects the mode that each memory pair initially enters. The microprocessor provides the value N used by Divide-by-N block 128, which in turn determines the integration period in integer multiples of 20 milliseconds. For example, a value of N=2 leads to an integration period of 40 milliseconds.

Memory Signal Timing

Figure 13:
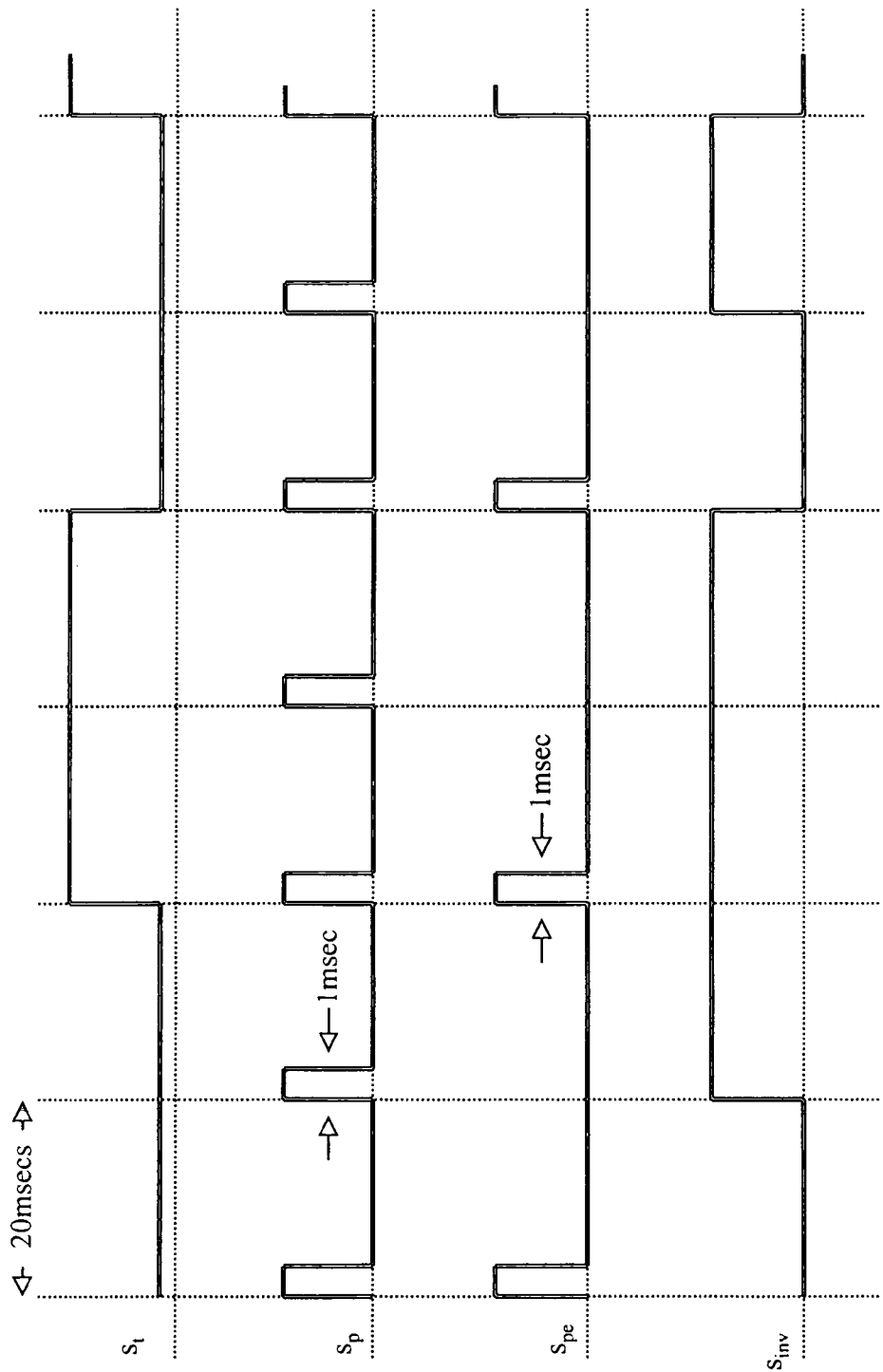
FIG. 13 is a timing diagram (not to scale) of the memory processor shown in FIG. 9.

FIG. 13 shows, although not to scale, the timing associated with some of the important signals in memory processor 83 (FIG. 8). Signals $s_t$, $s_p$ and $s_{pe}$ are generated by control processor 91 (FIG. 9), and signal $s_{inv}$ is generated by adder processor 92. All four signals have timings related to the 20 msec data bit from a particular satellite. Signal $s_t$ toggles every N×20 msecs and is used to toggle modes between memory pairs 1 and 2. FIG. 13 shows $s_t$ toggling every 40 msecs to provide an integration period of 40 msecs. Signal $s_p$ is set high for the first millisecond of a 20 msec period, and is used by INV FF 119 described above in connection with FIG. 11 to latch in the data bit value provided by the microprocessor. Signal $s_{pe}$ is set high for the first millisecond of a N×20 msec integration period, and is used to clear the first memory entry when writing to a memory pair during the first millisecond of the N×20 msec period. The signal $s_{inv}$ is provided by INV FF 119, and may be controlled by the microprocessor in accordance with knowledge of the satellite's data bits (e.g. from SAAI source) to allow integration periods of longer than 20 msecs.

Addition of Decimation Filter

Figure 14:
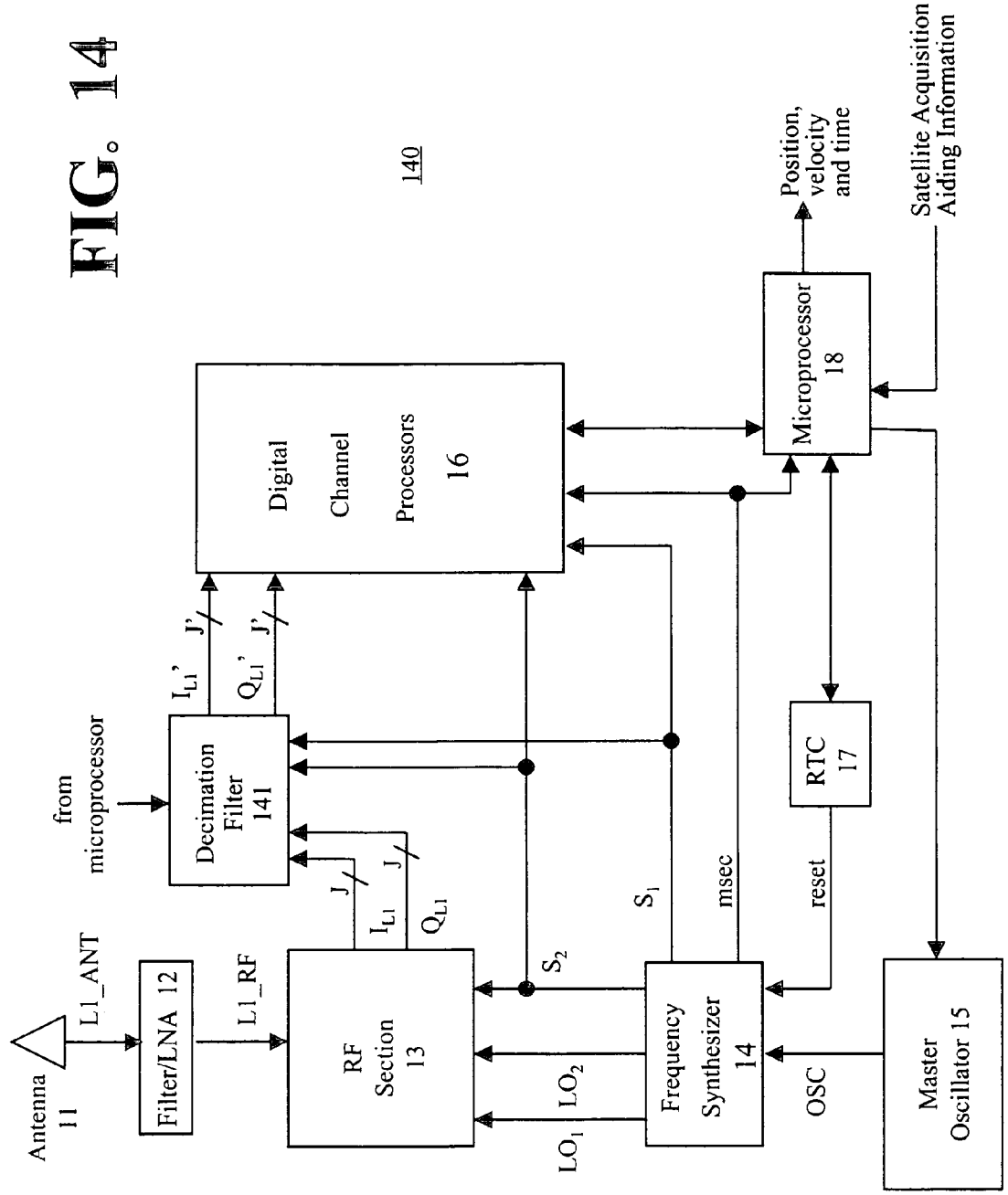
FIG. 14 is a block diagram showing a second embodiment of a GPS receiver which incorporates the present invention.

FIG. 14 shows a second embodiment of a GPS receiver 140 in accordance with the present invention. GPS receiver 140 is similar to GPS receiver 1 (FIG. 1) and has decimation filter 141 in addition.

Use of a higher signal sampling rate has the benefits of reduced noise and multipath mitigation. Decimation filter 141 allows the receiver to have a higher incoming sampling rate (e.g. 25 MHZ) along with fast acquisition and low SNR. If a higher sampling clock is used without the use of a decimation filter the memory required would be much larger and the relative playback speed benefit would be considerably less.

Decimation filters are well known in the art, as described, for example, in ADSP Primer@, C. B. Rorabaugh, pages 333–340, ISBN 0-07-054004-7. The purpose of such a filter is to slow the sampling rate down from input to output and also to reduce the bandwidth so that the Nyquist criterion is met (required to ensure no signal-to-noise-ratio loss). The input sample rate of decimation filter 141 may be 25 MHZ (samples signals $I_{L1}$, $Q_{L1}$) and the output sample rate may be 2.5 MHZ (samples signals $I_{L1}'$, $Q_{L1}'$).

Enhanced Digital Channel Processor with Decimator

Figure 15:
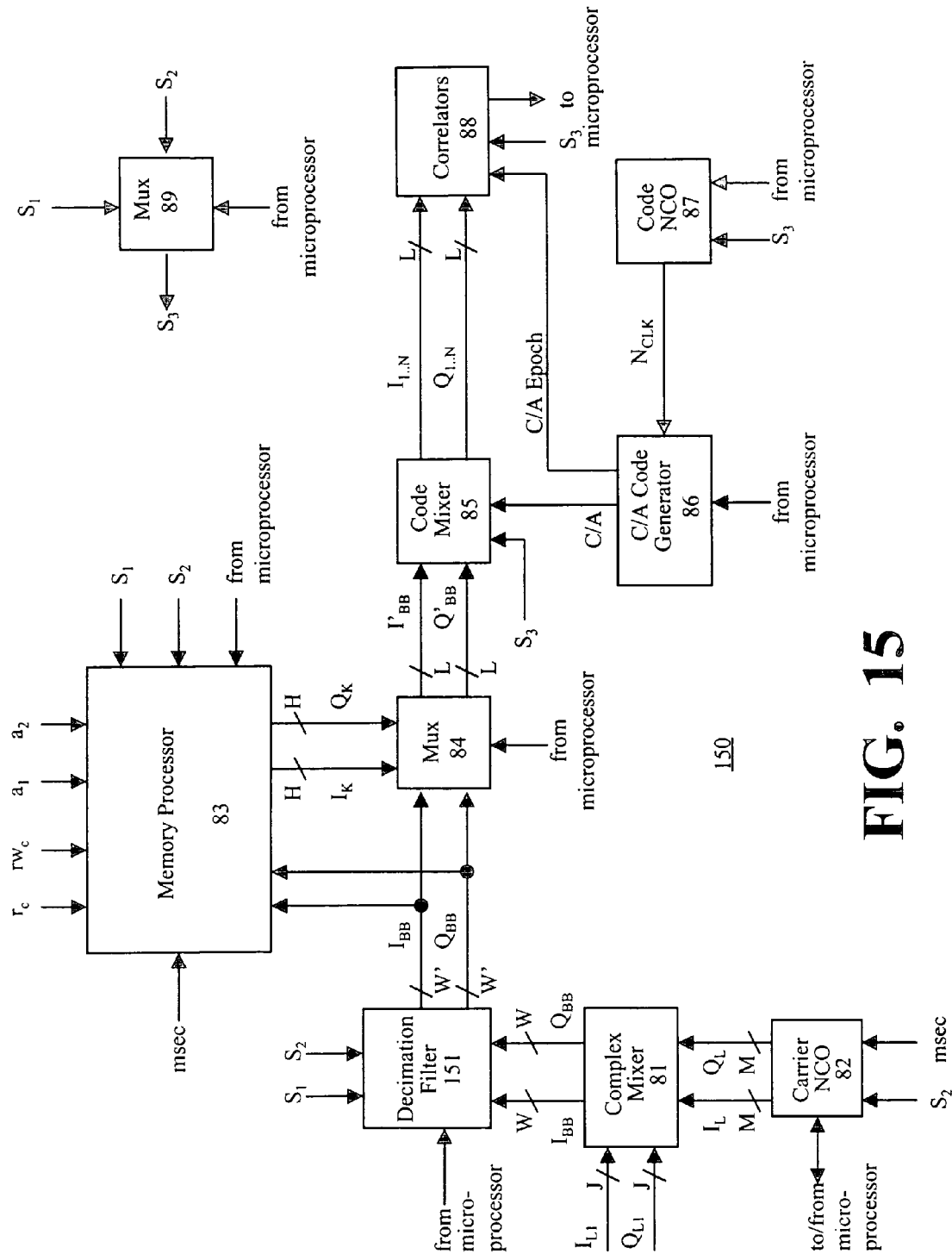
FIG. 15 is a block diagram of a second embodiment of an enhanced digital channel processor in accordance with the present invention.

Alternatively, a decimation filter may be incorporated in the Enhanced Digital Channel Processor. FIG. 15 shows a second embodiment of an EDCP in accordance with the present invention. EDCP 150 is similar to EDCP 80 (FIG. 8), and has in addition a decimation filter 151. Decimation filter 151 is coupled to the outputs of complex mixer 81 in EDCP 150. The operation and purpose of decimation filter 151 are similar to those of filter 141 described above in connection with FIG. 14. One advantage of incorporating the decimation filter in the EDCP rather than outside of the EDCP is that the decimation filtering is performed at carrier baseband and hence there is less signal loss due to the filtering operation. Also the mode of each EDCP may be controlled independently of the modes of the other EDCPs.

Basic Decimation Filter, Decimation Filter

Figure 16A:
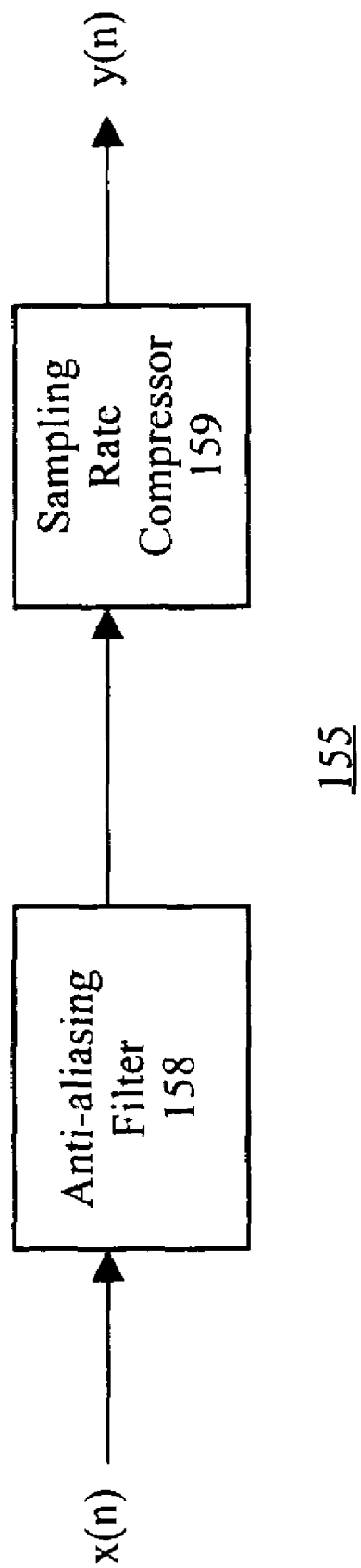
FIG. 16a is a block diagram of a basic decimation filter in a GPS receiver.

FIG. 16a shows one embodiment of a decimation filter that meets basic operational requirements. In decimation filter 155, the signal is filtered (in this case digitally filtered) by lowpass filter 158 which meets the Nyquist criterion for the slower output sampling rate. The output signal of filter 158 is then sampled at the slower clock rate by sampling rate compressor 159.

Figure 16B:
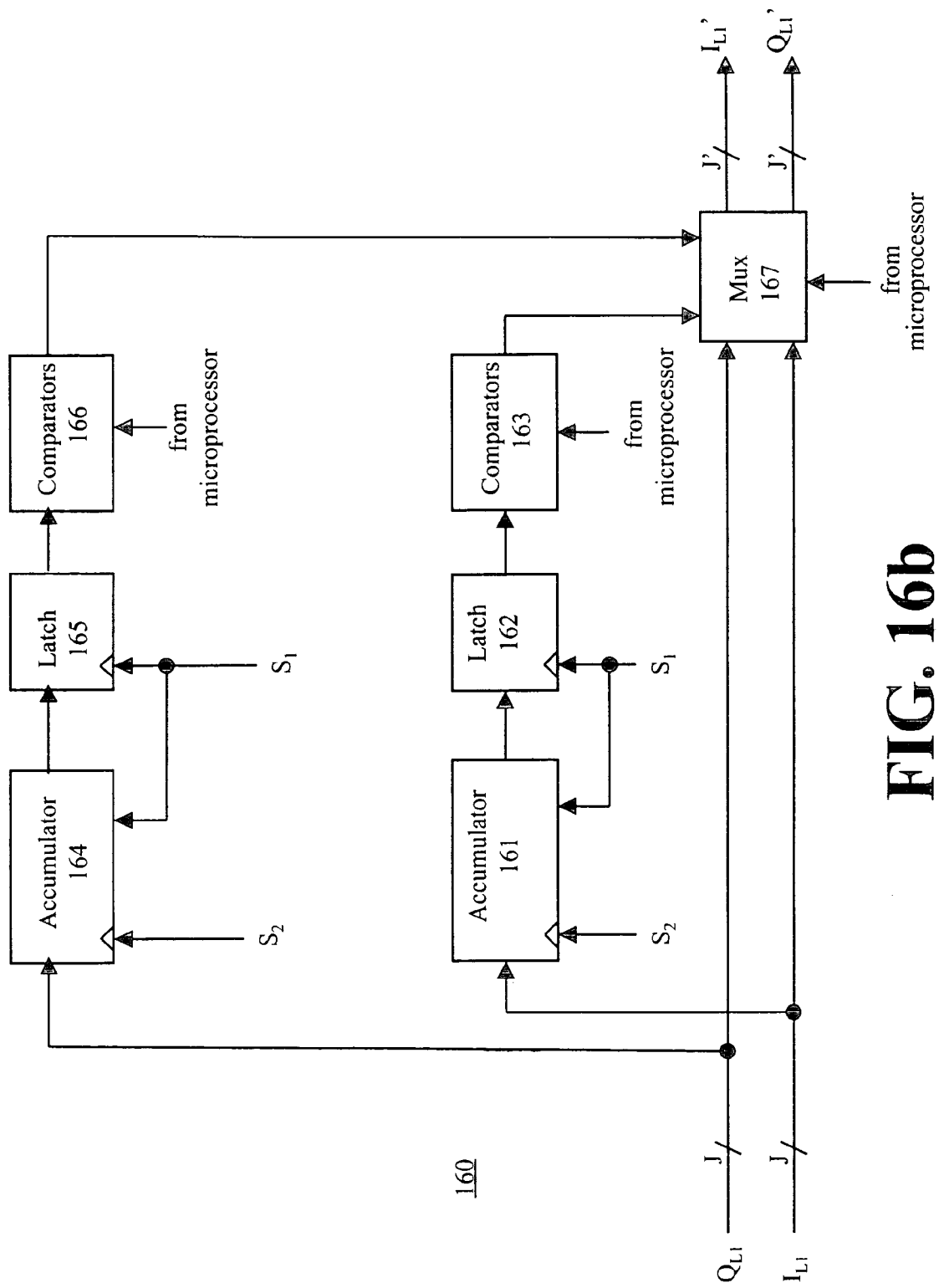
FIG. 16b is a block diagram of a decimation filter in a GPS receiver in accordance with the present invention.

FIG. 16b shows an alternative embodiment of a decimation filter in accordance with the present invention. In decimation filter 160, incoming samples ($I_{L1}$, $Q_{L1}$) at the higher sample rate S2 are accumulated in accumulators 161 and 164, respectively, over the period of the slower clock S1. The accumulators act as the lowpass filter. The outputs of accumulators 161 and 164 are latched by latches 162 and 165, respectively, at the rate of the S1 clock, and the latched outputs are supplied to comparators 163 and 166, respectively. Comparators 163 and 166 provide a mechanism for reducing the number of digital bits required in the output, hence preventing excessive bit fan-out in subsequent circuits that use these bits. Mux 167 is used to select whether the high rate or slow rate (decimated) samples are used as the output of decimation filter 160. This provides two possible modes for the receiver. First, when the decimation filter is used (i.e. the outputs of comparators 163 and 166 are passed through Mux 167), this is an optimal signal acquisition mode. Secondly, when signal power is found, the high rate samples (i.e. signals $I_{L1}$, $Q_{L1}$ are passed through Mux 167) may be used in 'continuous tracking' to provide a more accurate pseudo range measurement and also enhance multipath mitigation.

Code Mixer Block

Figure 17:
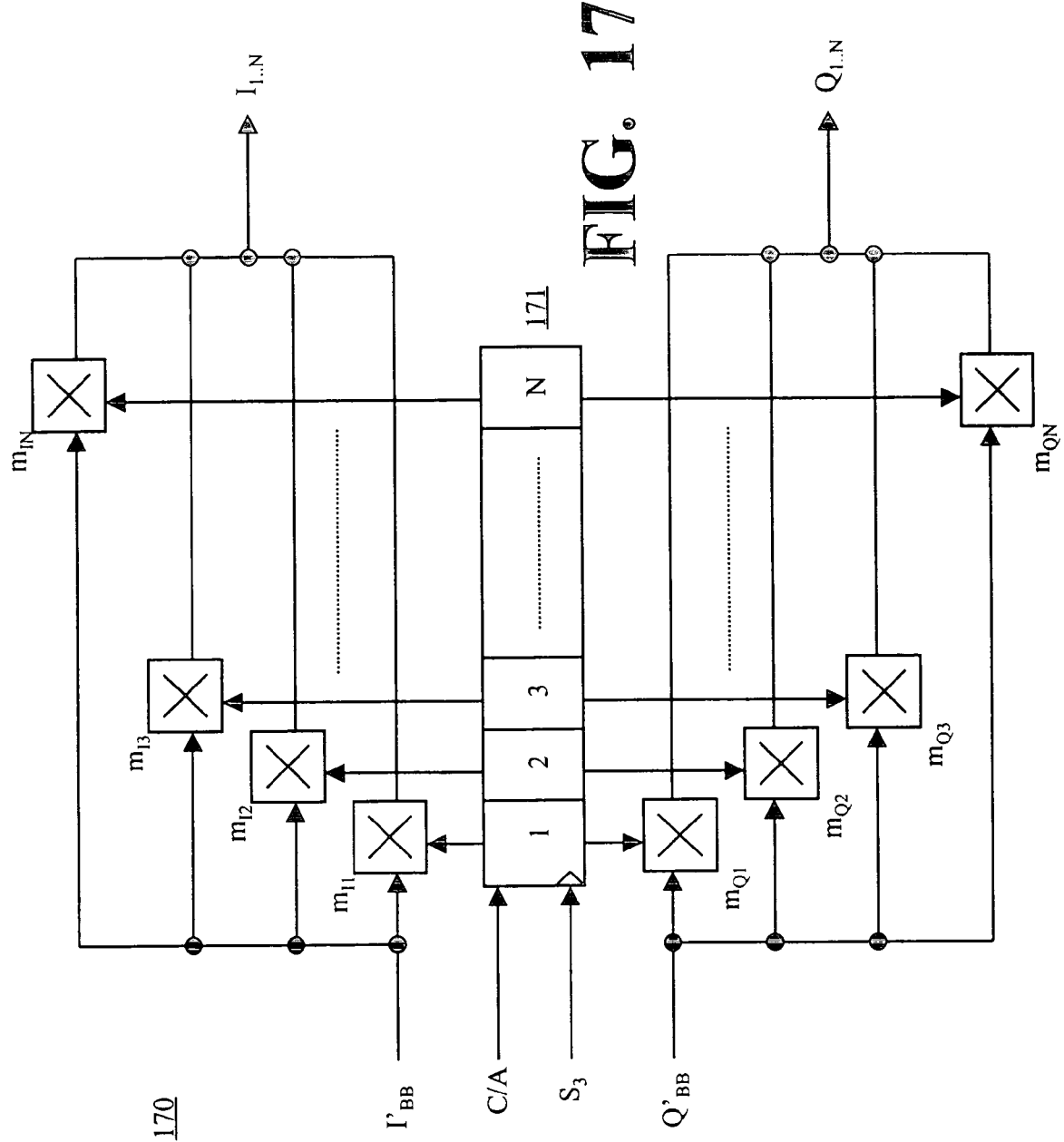
FIG. 17 is a block diagram of a code mixer in a digital channel processor in accordance with the present invention.

FIG. 17 shows one embodiment of a code mixer block in accordance with the present invention. In code mixer 170, N correlations are performed in each of the I and the Q signal paths. Shift register 171 generates delayed versions of the locally generated C/A code which are then multiplied by multiplexers $M_{I1}$ through $M_{IN}$ and $M_{Q1}$ through $M_{QN}$ with the incoming signals ($I'_{BB}$, $Q'_{BB}$) to provide multiple signals ($I_{1...N}$, $Q_{1...N}$) that are then accumulated in the correlators. Thus, block 170 is adapted for multiple correlators.

Data Bit Offset SNR Loss

Figure 18A:
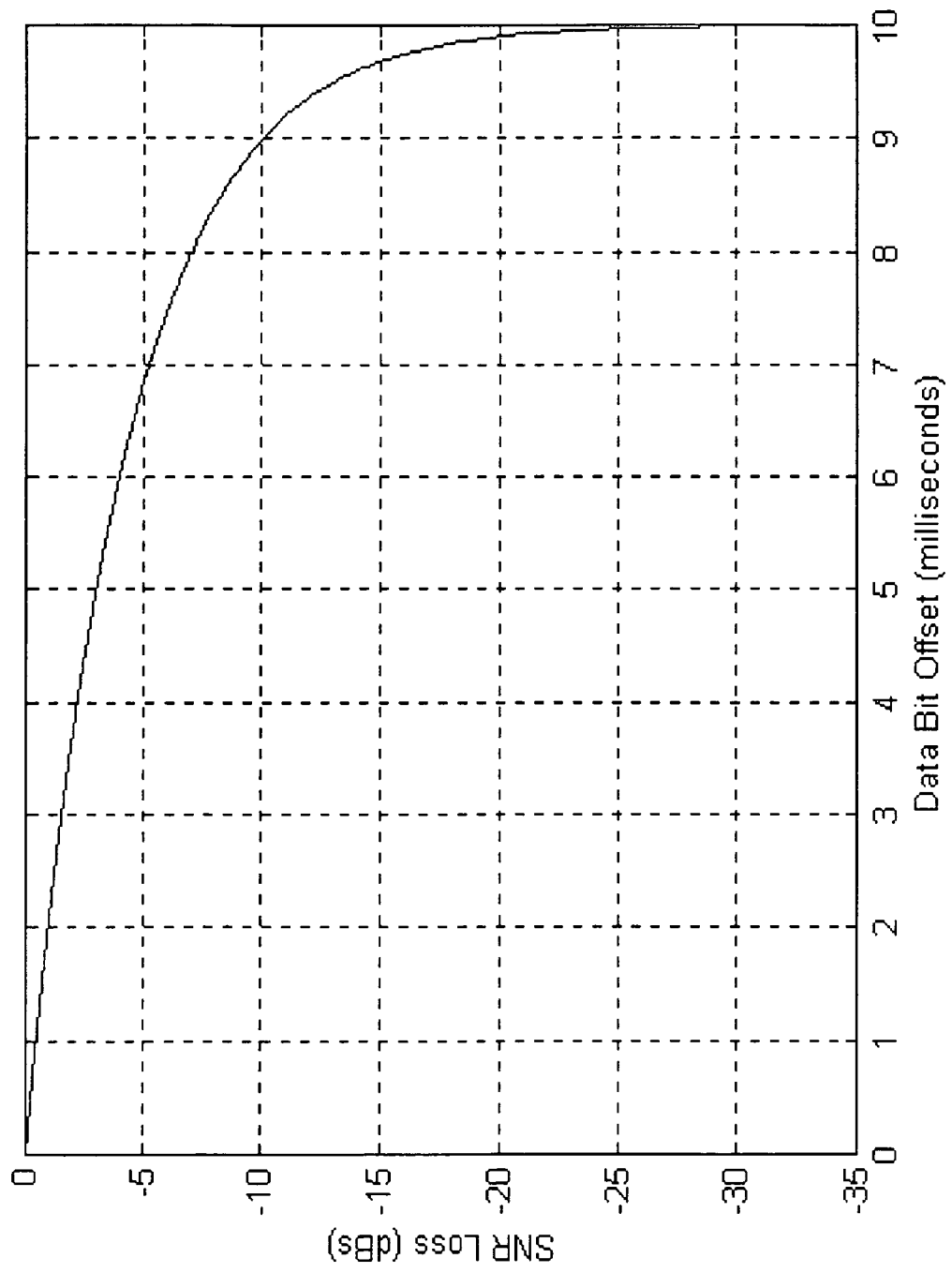
FIGS. 18a and 18b are graphic representations of a relationship between data bit offset and SNR loss in a GPS receiver in accordance with the present invention.

The circuitry in the embodiments described above allows the integration period to be aligned with the satellite's data bit edge to within +/−0.5 msecs. This provides significant circuit simplification as compared to a circuit that attempts to align the integration period exactly with that of the satellite's data period. FIG. 18*a* shows the worst case 50 Baud data (alternating ones and zeros) and the loss associated with being misaligned with the satellite's actual data bit edge. The actual satellite data stream may be considered random and this leads to less of a loss. At 10 msec misalignment the worst case provides no signal output over a 20 msec integration period.

Figure 18B:
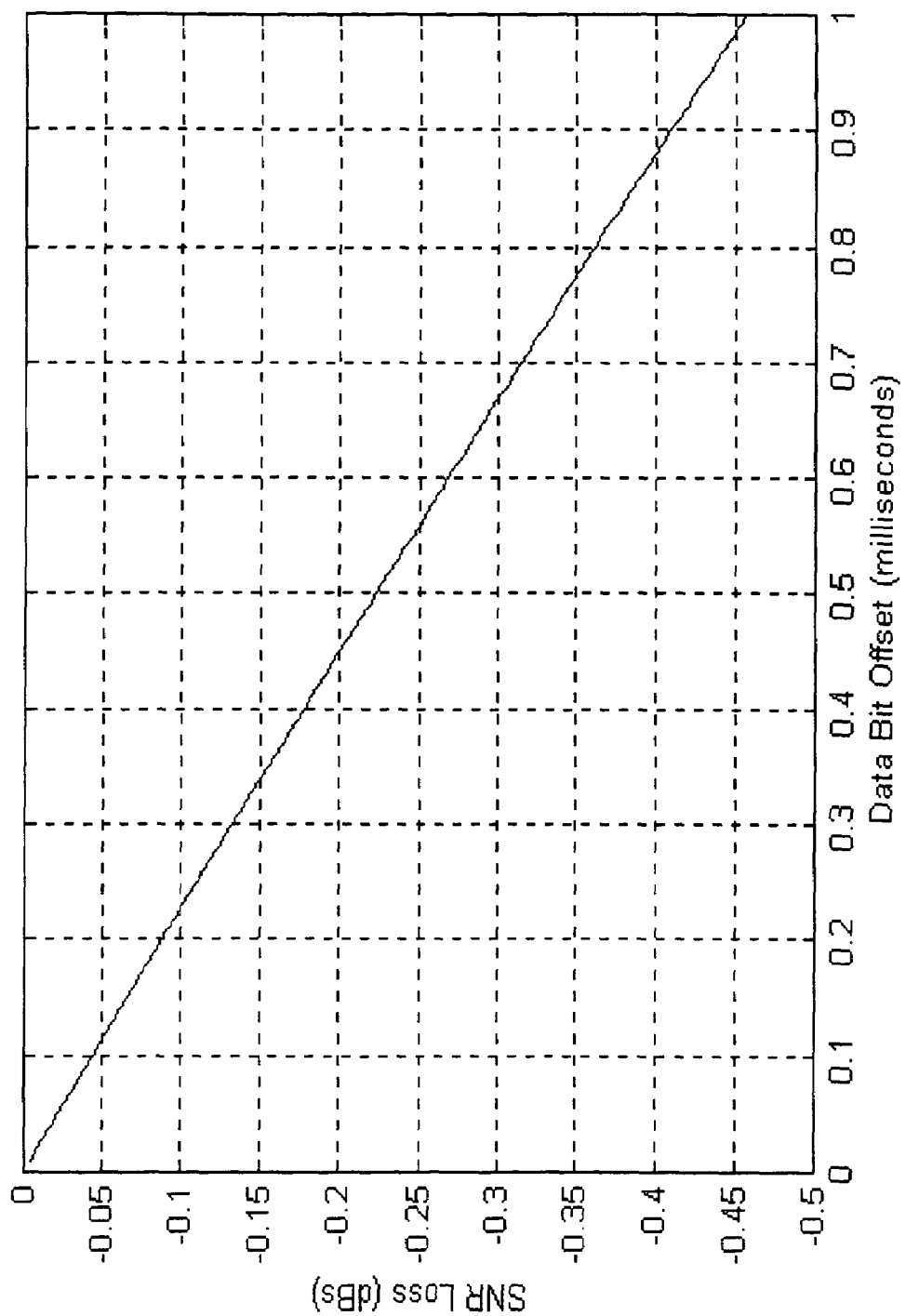

FIG. 18*b* provides a zoomed in view of the loss associated with a data bit offset of less than 1 millisecond. The data bit offset of interest for the current invention is a maximum of 0.5 msecs. FIG. 18*b* shows a maximum loss of approximately 0.2 dB at 0.5 msecs offset. This is considered an acceptable engineering tradeoff for the circuit simplifications gained. Also it is generally not possible to know the exact timing of the satellite's data bit edge, because of lack of knowledge of user position and lack of knowledge of user clock offset.

Effect of Carrier Frequency Offset

Figure 19A:
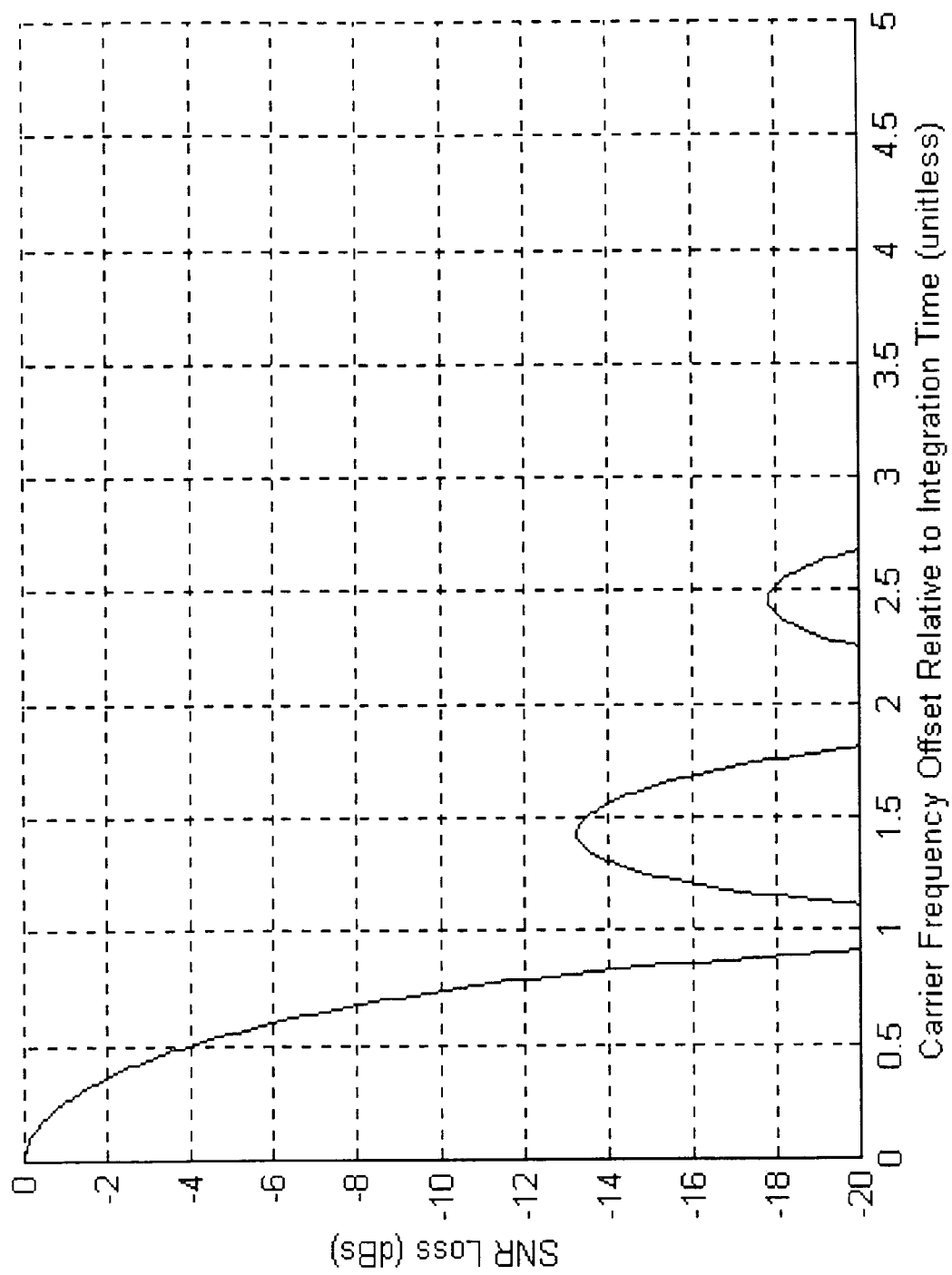
FIGS. 19a and 19b are graphic representations of a relationship between carrier frequency offset and SNR loss in a GPS receiver in accordance with the present invention.

The receiver as described above uses a carrier NCO to select a carrier frequency bin for searching. There is an error associated with not knowing the satellite's received carrier frequency exactly. FIG. 19*a* shows this loss. The product of the integration period and the carrier frequency offset is plotted along the x-axis. For example, integration over 20 msecs and a carrier frequency offset of 100 Hz gives a (unitless) value x=2. As FIG. 19*a* shows, the receiver needs to know a relatively accurate carrier frequency offset, and to set the frequency distance between carrier frequency search bins. This may be provided, for example, via the SAAI information or by using a reasonably good oscillator (in terms of frequency drift).

Figure 19B:
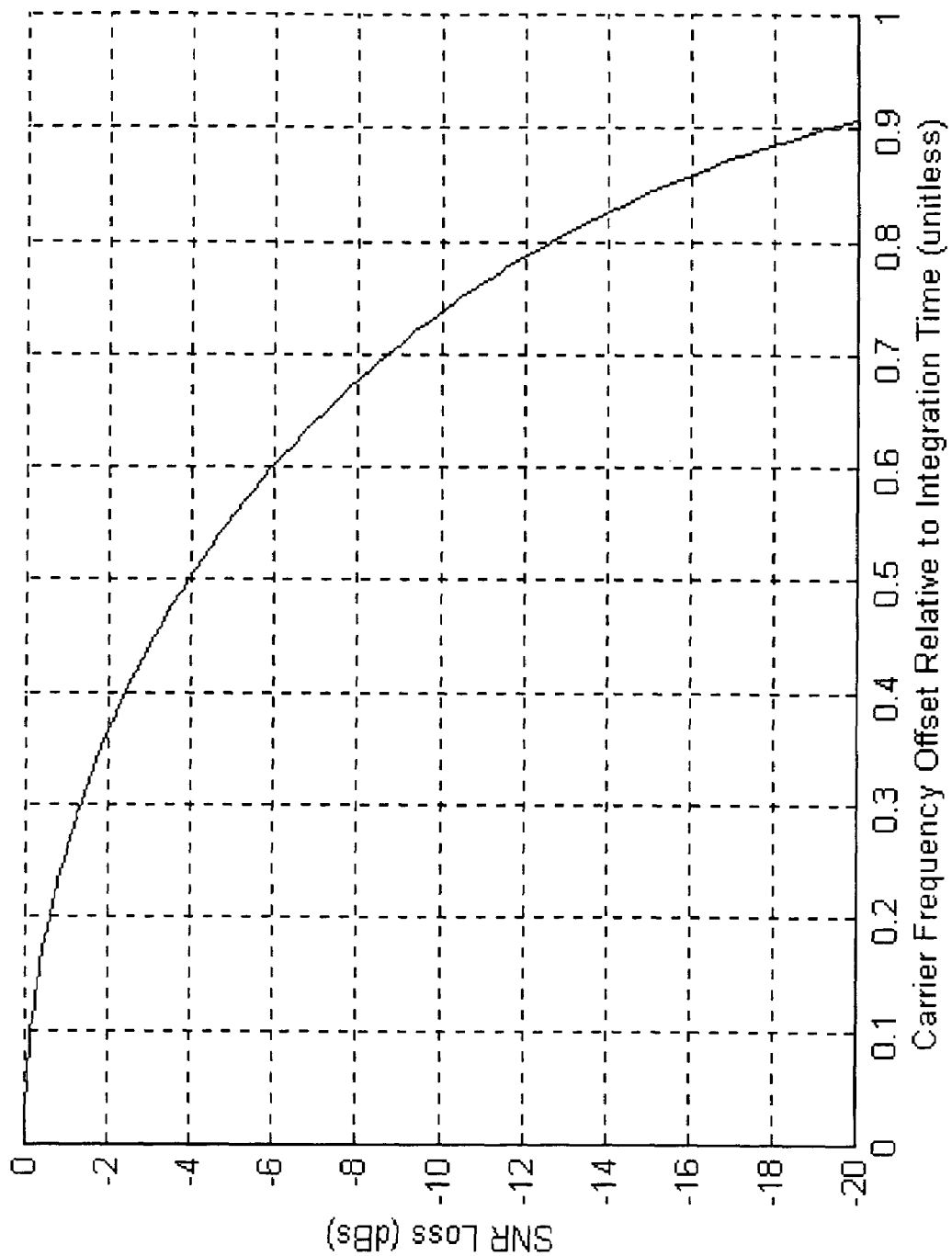

FIG. 19*b* is a zoomed-in view of the loss for a product less than 1. As FIG. 19*b* shows, x must be less than approximately 0.35 to reduce the loss due to carrier frequency offset to less than 2 dB. Translating this into an integration period of 20 msecs yields a maximum carrier frequency offset of 17.5 Hz. In applications that require low SNR operation it is important to minimize this loss. The receiver described above sets up a carrier NCO value and searches code phases rapidly at this carrier frequency. If the search for power fails, the carrier NCO value is updated and the code phase search is repeated. The frequency difference between these carrier NCO updates for the example given above would be 2×17.5 Hz=35 Hz.

Output of Memory Accumulation

Figure 20A:
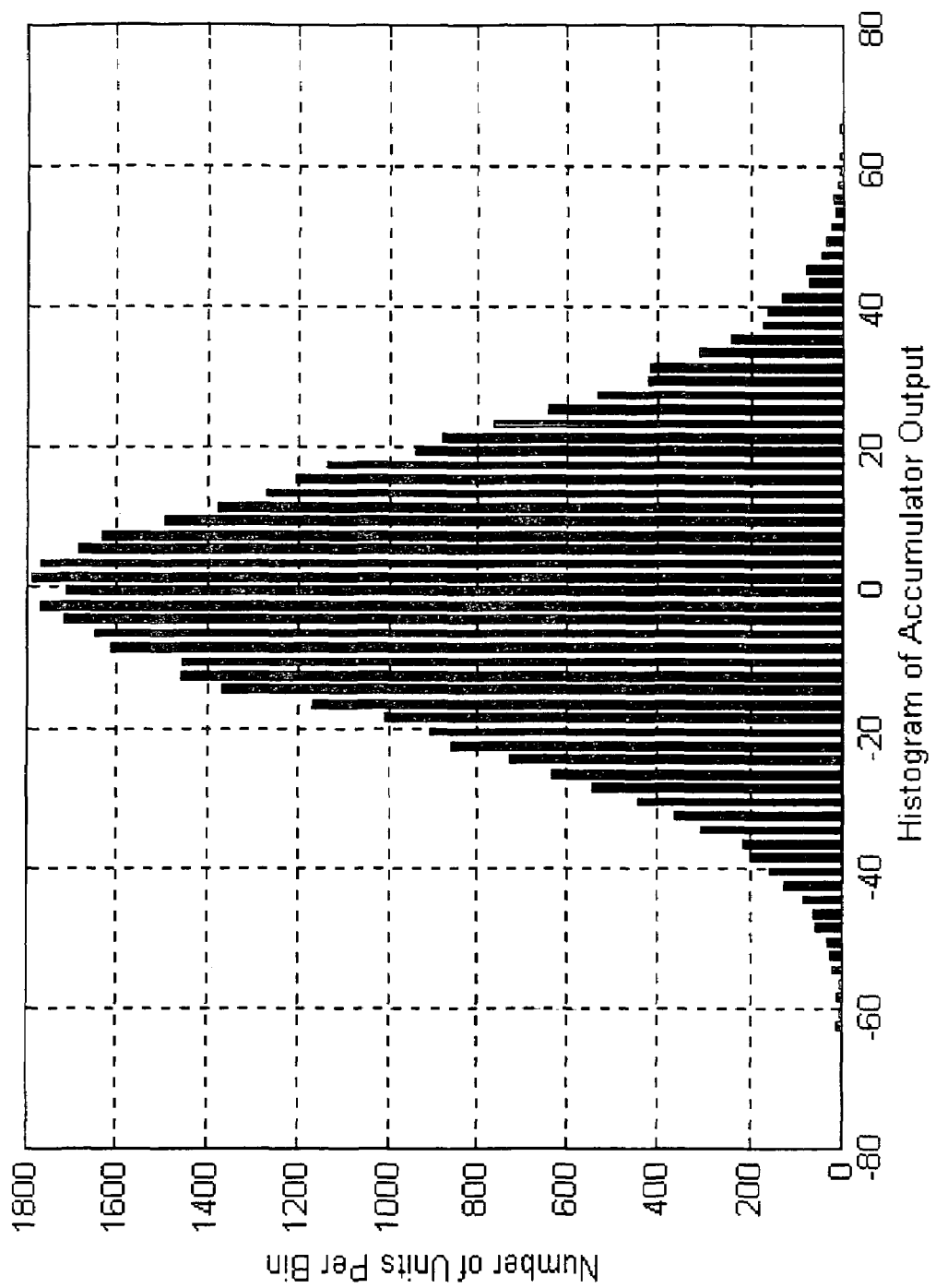
FIGS. 20a and 20b are histograms of accumulator output in a GPS receiver in accordance with the present invention.
Figure 20B:
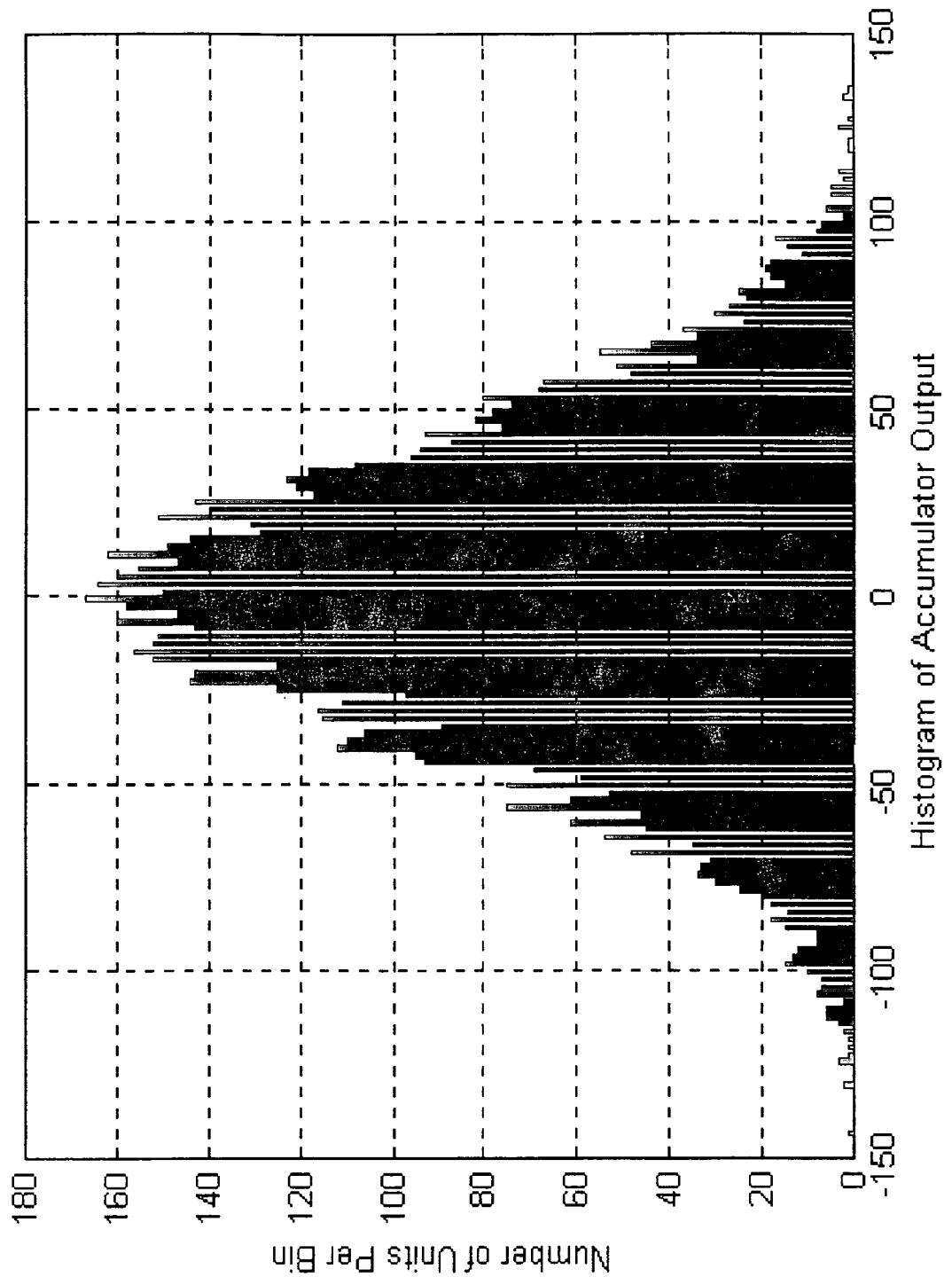

FIGS. 20*a* and 20*b* show histograms used for determining the number of bits (Y) required for successful operation in memory processor 83, as described in connection with FIGS. 8 and 9. The histogram also allows optimal selection of comparator values for MUX 95. The histograms shown in FIGS. 20*a* and 20*b* are based on 2-bit quantized signals ($I_{BB}$, $Q_{BB}$).

GPS satellite signals are generally received with negative signal to noise ratio (i.e. the noise is significantly larger than the signal in the code modulation bandwidth). The code correlation process provides the gain necessary to extract a useful positive signal to noise ratio. The memory processor accumulates the signal plus noise before the code correlation process is performed by the fast playback circuitry. Hence, the resulting SNR in the summations is dominated by noise. The histogram of FIG. 20*a* shows the output of accumulating over a 20 msec period. The histogram allows us to select an optimal number of bits for the memory devices, in this case 6 bits (which allows a range of +/−31). The accumulation may be stopped if it reaches values of +/−31 during the accumulation. FIG. 20*b* shows a similar histogram while integrating over a 100 msec period. In this case 7 bits is more appropriate.

The optimal selection of comparator values in MUX 95 is linked to the standard deviation of the expected output signal from the memory processor. Optimal selection of levels when quantizing largely noisy signals is well known in the art, as described in, for example, A Global Positioning System: Theory and Applications@, Volume 1, ISBN 1-56347-106-X. If an output of 3 bits from MUX 95 is required, the comparator levels should be set to the standard deviation divided by the square root of three. For example, with a standard deviation of 18, as in the example shown in FIG. 20*a*, comparator values would be set at approximately 10 and 6 (the sign bit provides the third bit).

Decimator Output

Figure 21A:
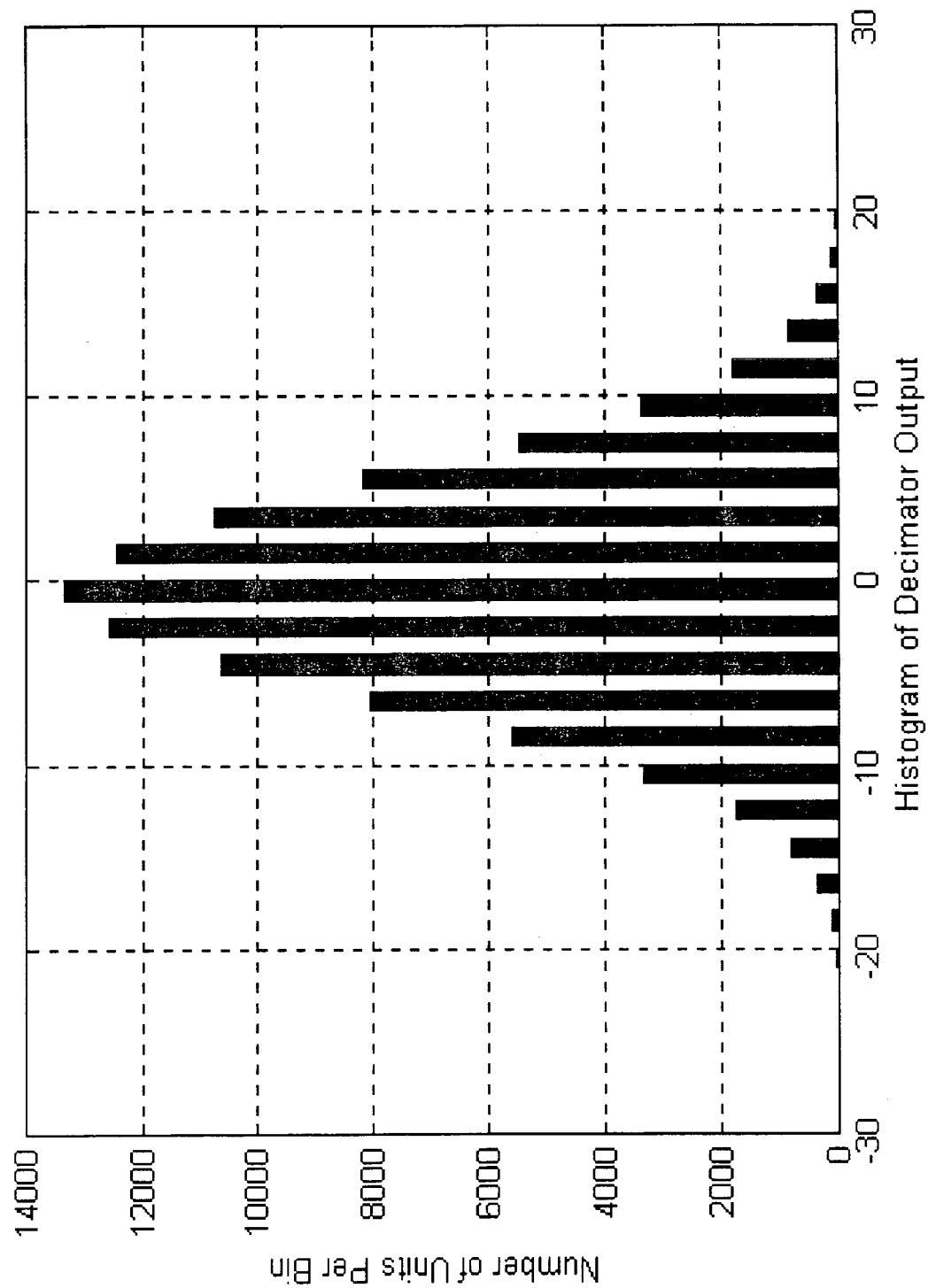
FIGS. 21a and 21b are histograms of decimator output in a GPS receiver in accordance with the present invention.
Figure 21B:
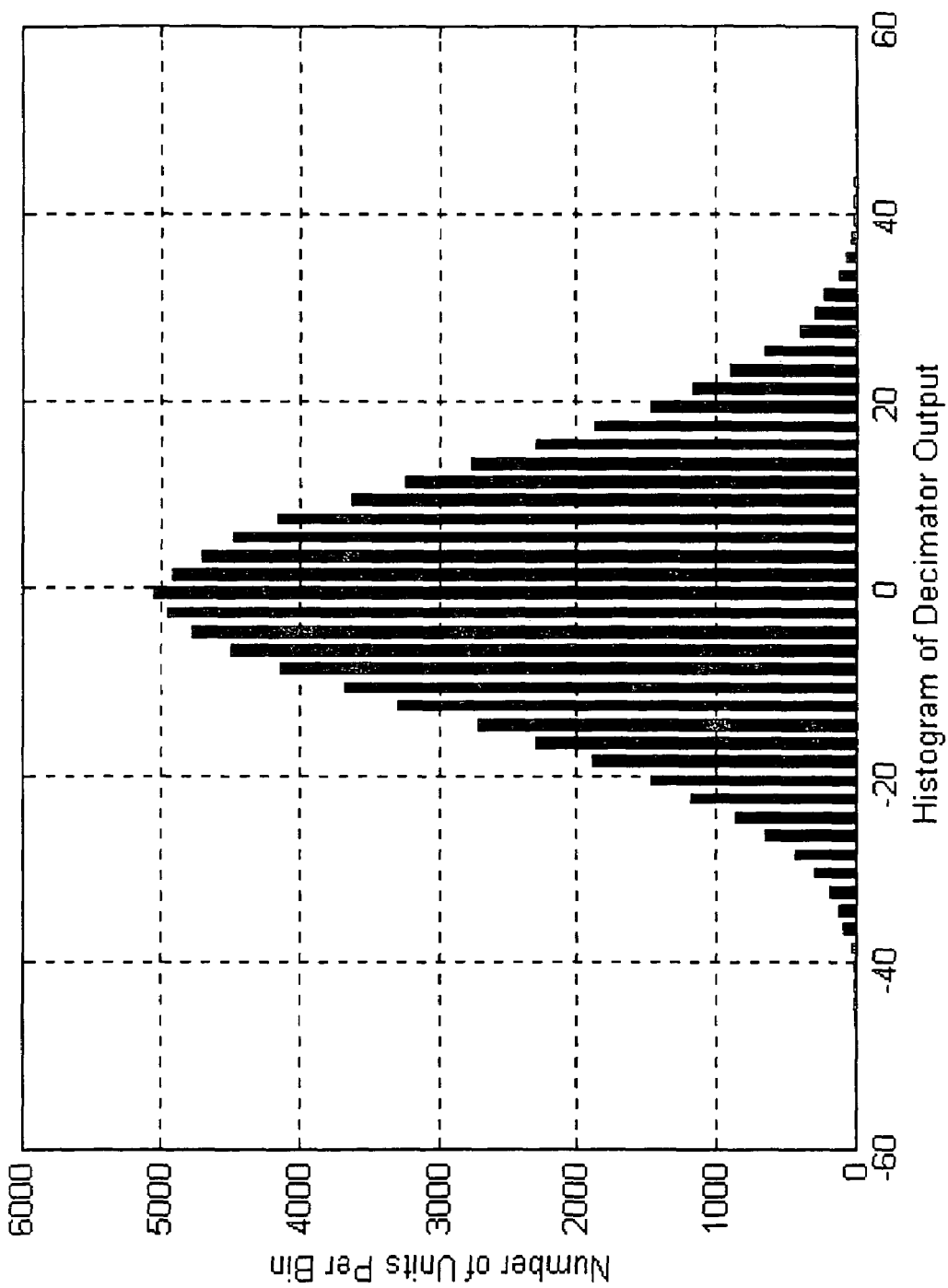

The principles applied in FIGS. 20*a* and 20*b* apply when determining the number of bits in the output of the decimator filter, as described in connection with FIG. 16*b*. FIG. 21*a* shows a histogram when the decimator filter is used as described in connection with FIG. 14. FIG. 21*b* shows a histogram when the decimator is used as described in connection with FIG. 15. Again the assumption that the accumulation is mostly noise-like still applies.

Pseudorange Accuracy

It is well known in the art, as described, for example, in "Global Positioning System: Theory and Applications", Volume 1, ISBN 1-56347-106-X, that use of a wider bandwidth improves the pseudorange accuracy. The invention provides a method for combining the accelerated signal search with the advantages of an improved pseudorange measurement (WB mode).

Figure 22:
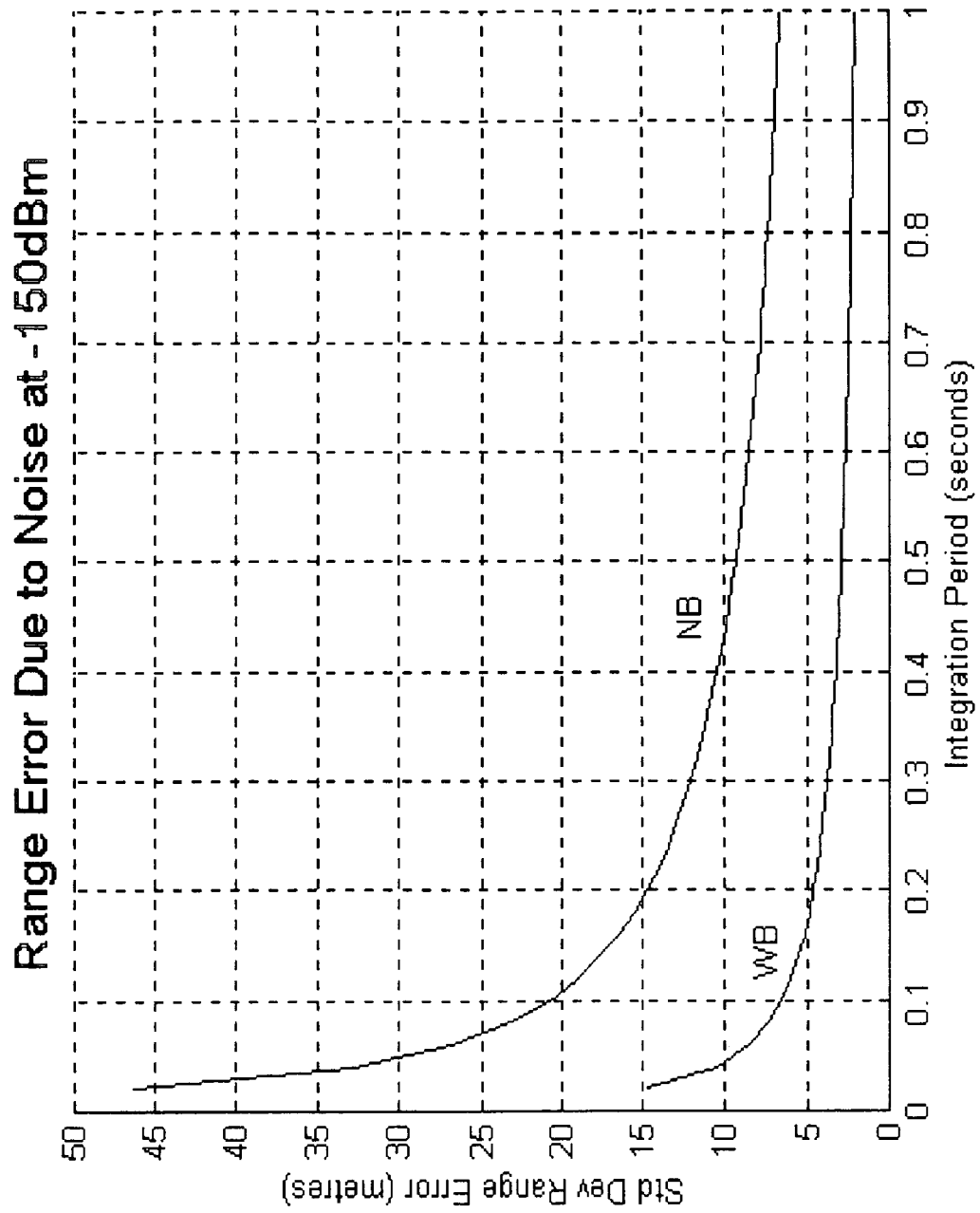
FIG. 22 is a graphic representation of pseudorange accuracy in a narrow band mode and a wide band mode in a GPS receiver in accordance with the present invention.

FIG. 22 illustrates the pseudorange accuracy expected for NB (narrow band) and WB (wideband) modes, for an input signal level of −150 dBm, versus the signal integration time used. When the bandwidth of the WB mode is 10 times that of the NB mode (requiring a sampling rate that is 10 times higher), the pseudorange is expected to be sqrt(10) times improved for WB mode. This becomes particularly significant as the signal level drops, for example, inside a building. The invention allows less integration time for the same pseudorange accuracy, once the signal is found. Hence, the invention allows a position fix more rapidly than other techniques under similar circumstances.

Pseudorange Measurement

Figure 23:
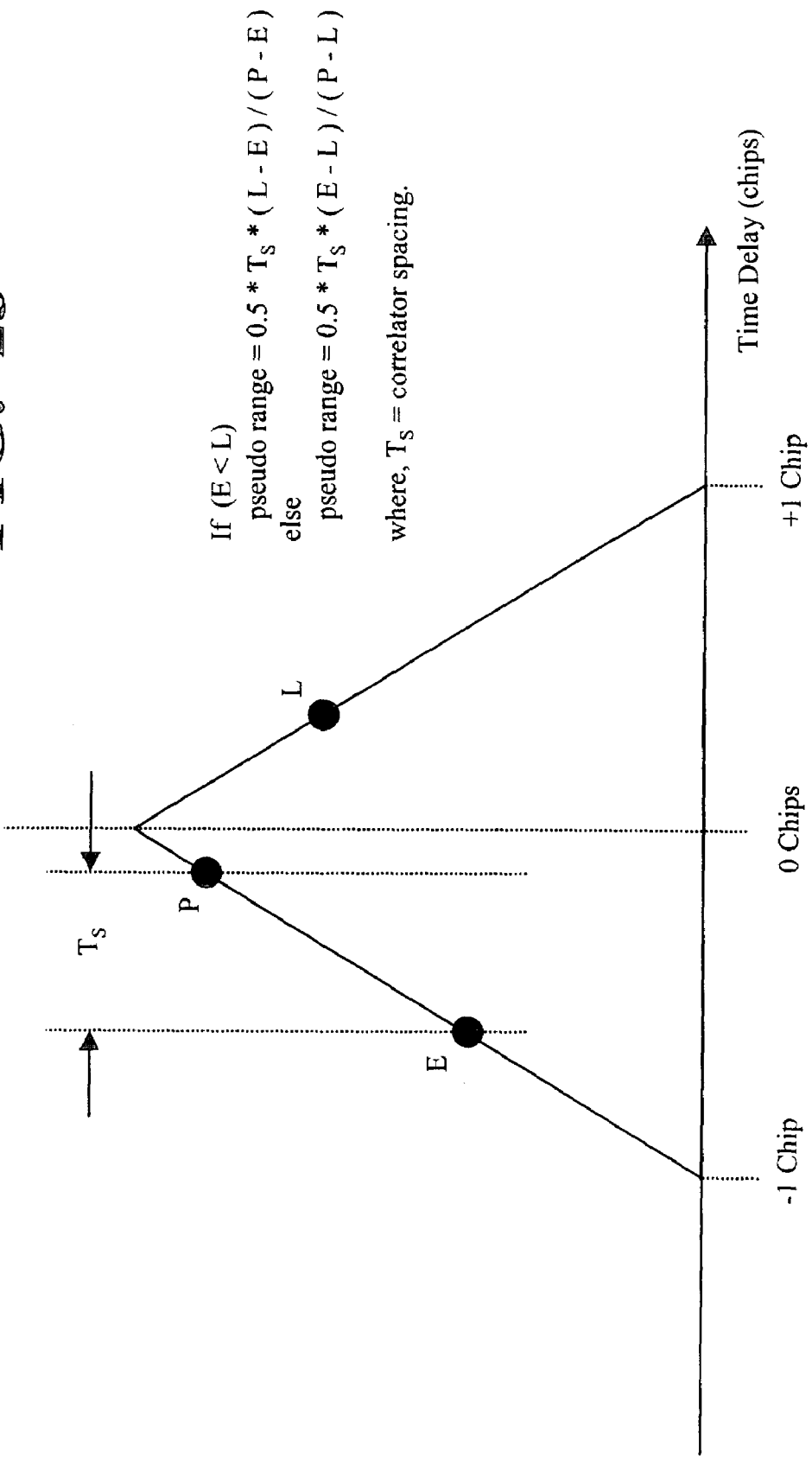
FIG. 23 is a graphic representation of use of correlation values for computing pseudorange in a GPS receiver in accordance with the present invention.

FIG. 23 illustrates one method for computing pseudorange once signal power has been detected. The output of the correlation process is a series of correlation values which are read by the microprocessor. FIG. 23 shows correlations E, P and L, and the equations required to compute the pseudorange from these values. Each of the E, P and L values may be the square root of the sum of the squares of I and Q values.

In practice the receiver's filtering processes round off the sharp peak shown in FIG. 23. The pseudo range calculation may include an additional calibration term to take into account the effect of filtering. A lookup table may also be used to relate E, P and L values to pseudorange. The lookup table (and calibration) values may be measured empirically using a GPS signal simulator.

Alternatively, once signal power has been found, the circuitry may be switched to continuous tracking mode and loops locked in the standard way (code and carrier tracking loops), leading to pseudorange and carrier phase measurements.

Data Transition Detector

Figure 24:
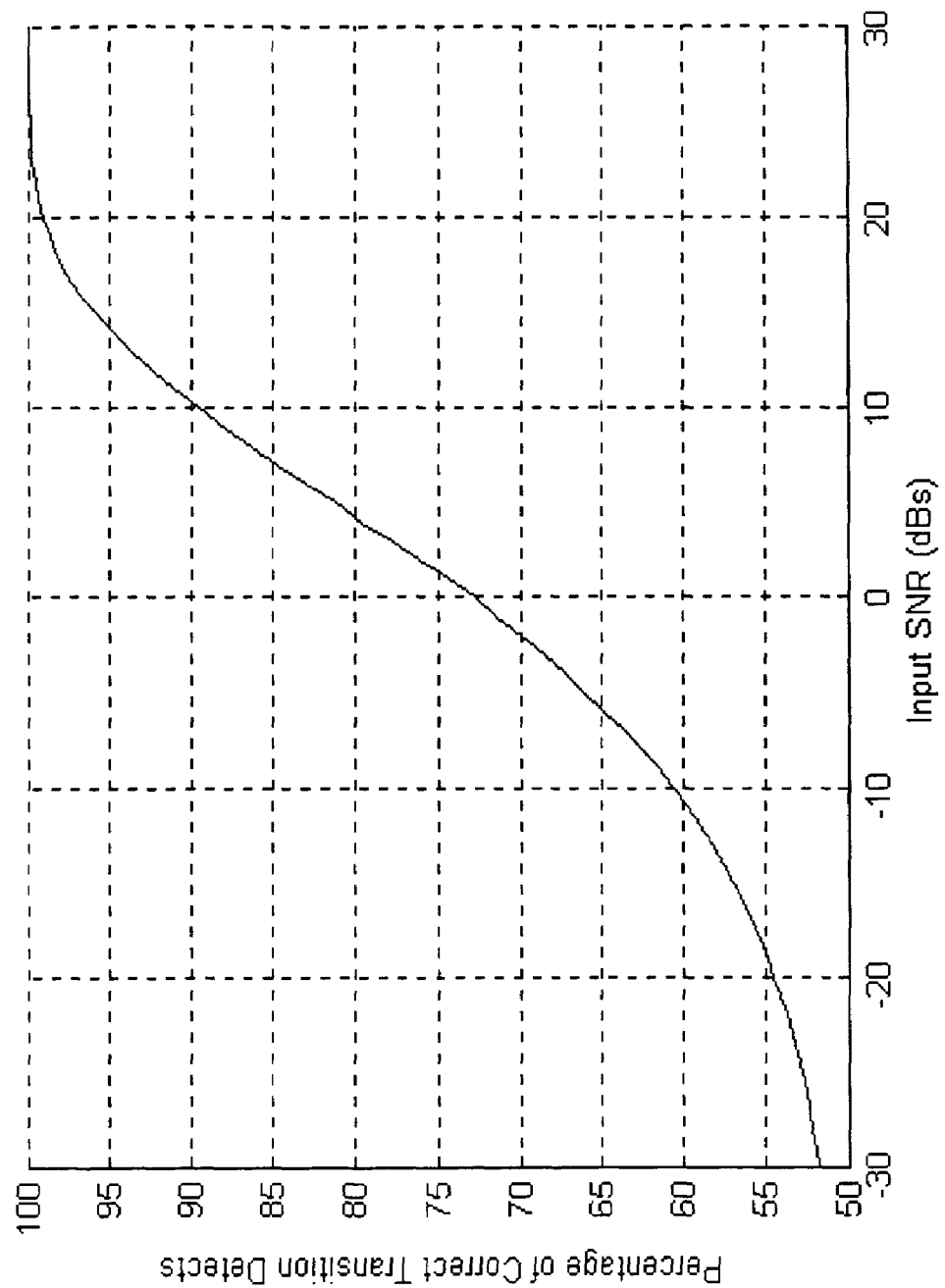
FIG. 24 is a graphic representation of a relationship between input SNR and percentage of correct transition detection in a GPS receiver in accordance with the present invention.

Knowledge of data bit transitions may be supplied via the SAAI link or by attempting to calculate when a transition has occurred from the signal itself. This may allow effective extended integration periods, improving signal detection capabilities. FIG. 24 illustrates the percentage of correct transition detects for a given input SNR, for an optimal transition detector. The input SNR refers to the SNR available after the correlator values are read into the P, i.e. this is a post correlation SNR. The normal operating range is a positive SNR (for example +10 to +20 dBs). FIG. 24 illustrates that there is a high percentage of successful data transition detect at these SNRs.

An example of an optimal transition detector is given as:

$$Det = I_k I_{k-1} + Q_k Q_{k-1}$$

$I_k$, $Q_k$ are the current correlator values and $I_{k-1}$, $Q_{k-1}$ are the previous correlator values. A transition has occurred when Det<0.

Method 1—NB Mode (20 msec Integration Period)

Figure 25:
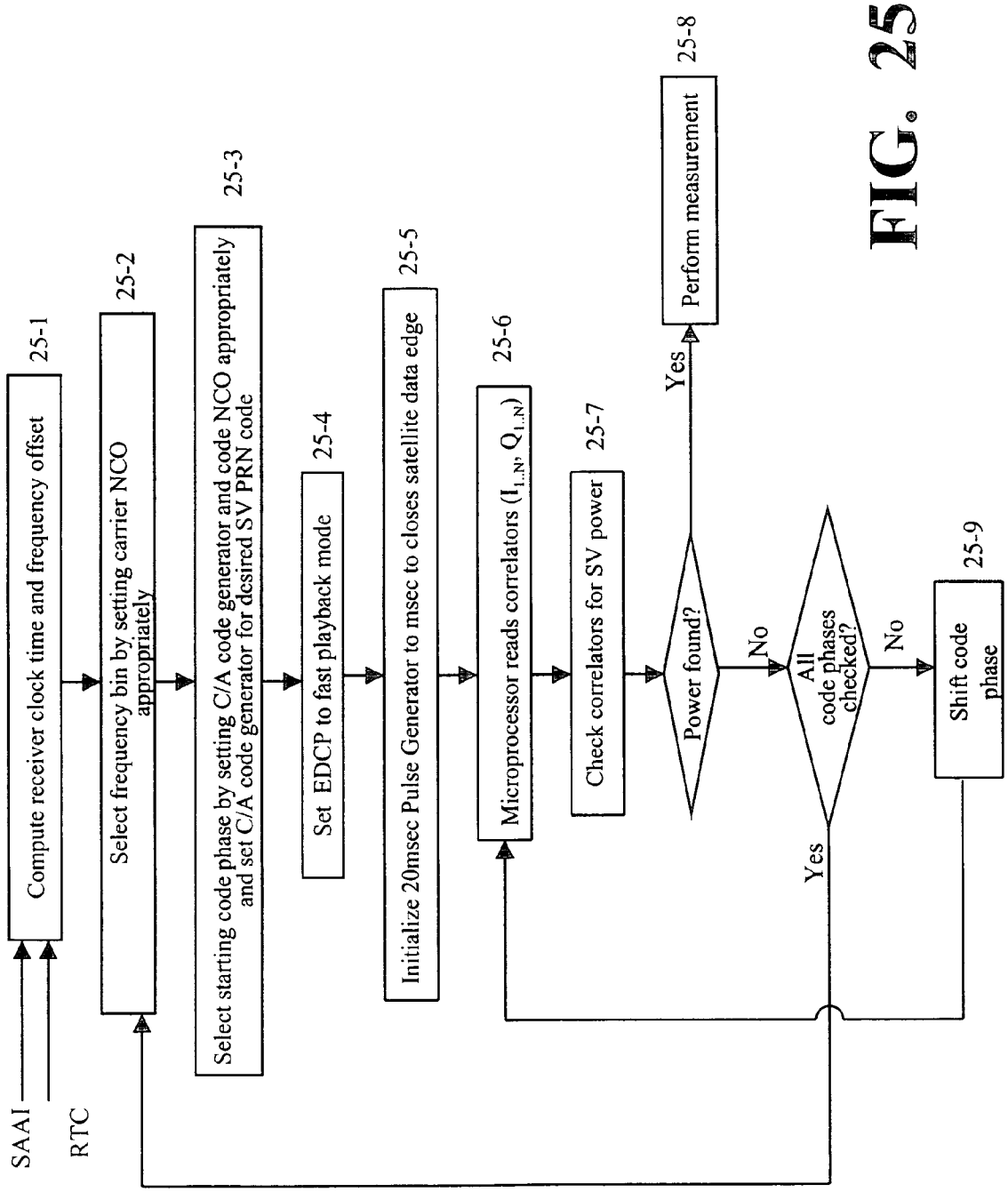
FIG. 25 is a flow chart of a method of operation in a narrowband mode of an enhanced digital channel processor in a GPS receiver which is in accordance with the present invention.

FIG. 25 shows a method executed by the EDCP in a NB mode E DCP. The search ranges of both carrier frequency and code phase are determined in step 25-1, which involves determining the most accurate source of time, either from the SAAI information or the RTC information. The RTC information contains the receiver's own knowledge of time, which may be adequate for short receiver-OFF periods, e.g., 20 mins. The SAAI information may provide improved information over the long term. The SAAI information may also provide some information relating to user position, which also impacts the receiver's knowledge of time based on the satellite's knowledge of time. Similarly, the receiver's oscillator frequency offset may be estimated using the known drift characteristics of the particular oscillator or provided via the SAAI information.

An SV search strategy is then set, given the estimated time and frequency values (and the uncertainty in these values). The E DCP searches the frequency domain by stepping through the carrier NCO output frequency for all code phases. The EDCP searches the time domain by stepping through the code phases range using a combination of the code NCO and C/A code generator. The code NCO allows fractional chip shifts, and the C/A code generator allows whole C/A code shifts.

In step 25-2, the carrier frequency bin, is selected by setting the carrier NCO appropriately. In step 25-3, the code phase is selected by setting the C/A code generator and code NCO appropriately (and also setting the C/A code generator to receive a particular PRN).

In step 25-4, the EDCP is set to fast playback mode. For example, Mux 89 (described above in connection with FIG. 8) is controlled to output $S_2$ and Mux 84 (described above in connection with FIG. 8) is controlled to output the signals $I_K$, $Q_K$ supplied by the memory processor block.

In step 25-5 the receiver's time and position estimate is used to initialize the 20 msec Control Processor (described above in connection with FIGS. 5, 9 and 12) to synchronize the memory processor accumulation process to the satellite's 20 msec data bit edge.

At this point the EDCP is operating in fast acquisition/low SNR mode. The microprocessor then reads the correlators values in step 25-6. Next, the correlators values are used to determine in step 25-7 whether SV power is present. The following decision process is applied to each I, Q correlator pair (i.e. I and Q for a particular code phase delay in the correlation process):

$$SV \text{ Power Threshold} > (I^2 + Q^2)$$

If SV power is found, then measurements are performed in step 25-8. The pseudorange measurement may be performed as described above in connection with FIG. 23, and the carrier phase may be computed from arctan(Q/I). Alternatively, Mux 84 and Mux 89 (FIG. 8) may be switched to continuous track mode, and tracking loops are performed in a manner known in the prior art.

If SV power is not found and not all code phases have been checked, then the code phase is shifted in step 25-10, and steps 25-6 and 25-7 are repeated for the new code phase. If all code phases have been checked, then another frequency bin is selected and steps 25-2 through 25-7 are repeated.

Method 2—WB Mode (20 msec Integration Period)

Figure 26:
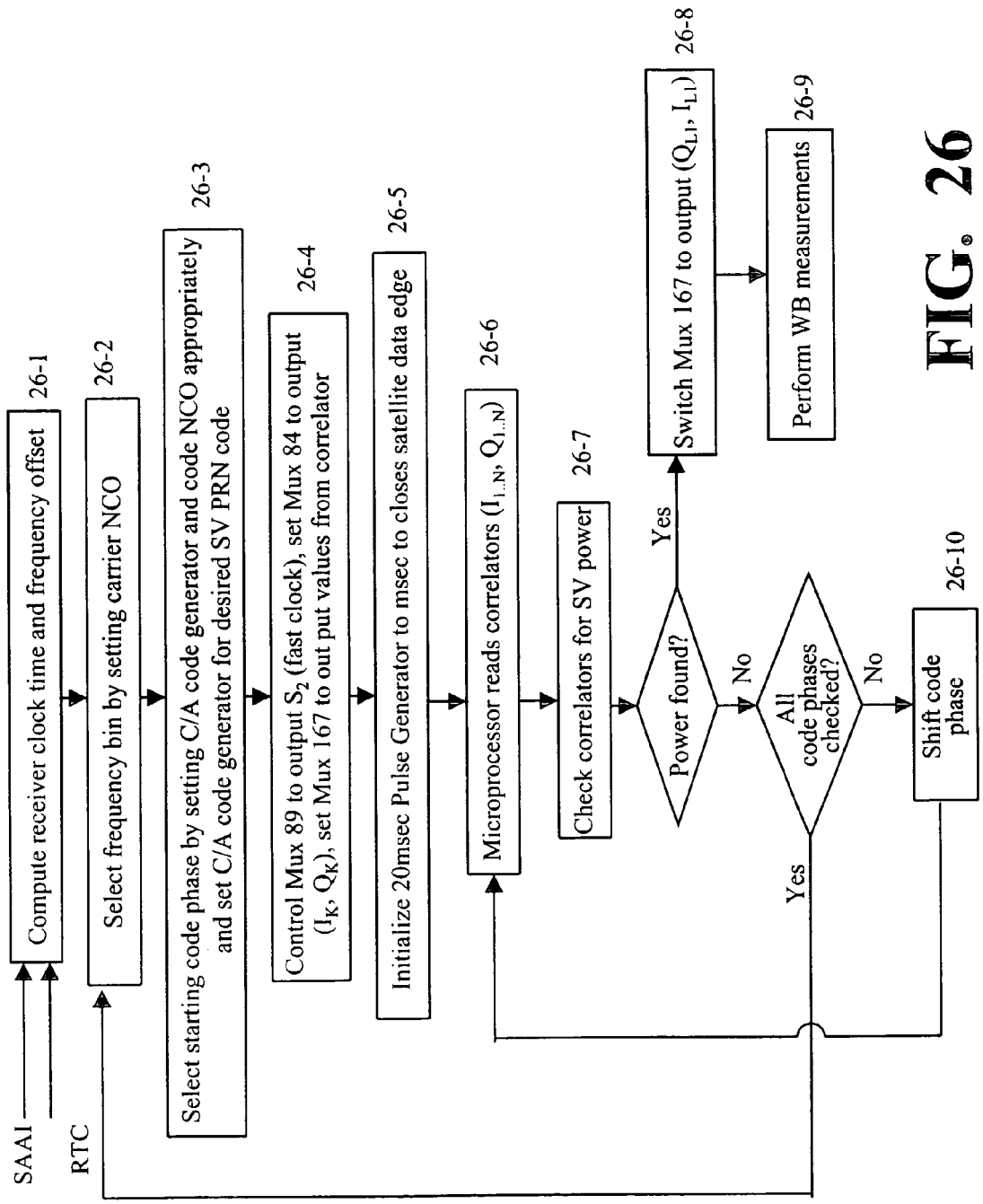
FIG. 26 is a flow chart of a method of operation in a wideband mode of an enhanced digital channel processor in a GPS receiver which is in accordance with the present invention.

FIG. 26 shows a method performed by the EDCP in a WB mode. Many of the steps are similar to those in the method described above in connection with FIG. 25. The differences are described below. Mux 167 (described above in connection with FIG. 16b) is controlled to output the decimated signals.

After signal power has been found, Mux 167 is controlled to output the non-decimated signals in step 26-8, and the measurements are performed on the wideband signal input in step 26-9. This may be performed by initiating a continuous tracking method, or by collecting correlation values using the wideband input. The wideband input correlation values may be collected using the memory processor circuitry running at the higher clock rate or by running the EDCP circuitry in standard mode. The resulting pseudorange measurement, performed using the wider bandwidth, would be more accurate than the NB mode.

Carrier Phase Rotation

It is more optimal in a standard receiver design to close a code tracking loop with the carrier tracking loop already closed. In this way the code tracking loop need only include I correlator combinations, which leads to an improvement in noise performance since the Q correlators largely contain noise. The same principle may be applied to the pseudorange measurement made using the EDCP. A process has been described above in connection with FIG. 23 which involves I and Q versions of E, P and L being combined to form the pseudorange measurement.

Figure 27:
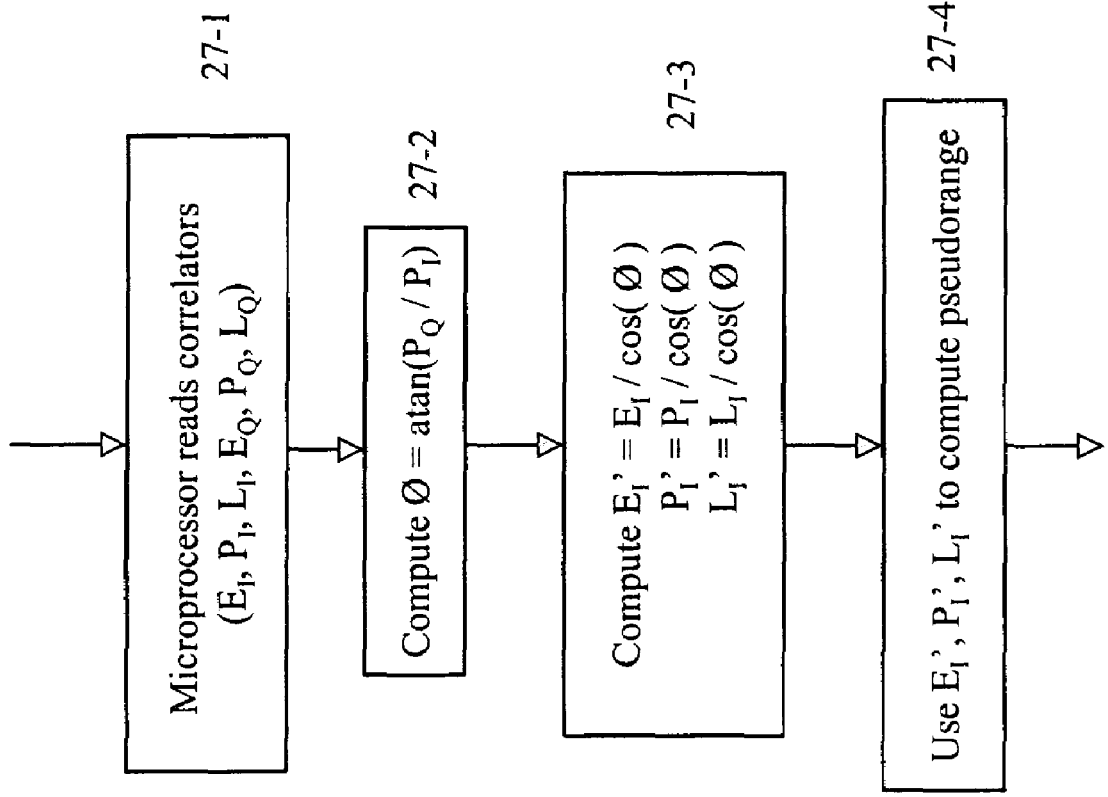
FIG. 27 is a flow chart of a method for removing carrier phase uncertainty which is in accordance with the present invention.

FIG. 27 shows a method for removing the carrier phase uncertainty (so that most of the power appears in the I correlator versions) to improve the noise performance of the resulting pseudorange measurement.

The microprocessor reads the correlators in step 27-1. In step 27-2 the carrier phase φ from the $P_Q$ and $P_I$ correlators (i.e. the ones containing most power) is computed. The carrier phase of the correlators is rotated in step 27-3 to produce new correlator values $E_I'$, $P_I'$ and $L_I'$ which contain most of the signal power in I. The phase rotated correlator values are used to compute the pseudorange measurement in step 27-4.

Extended Integration with Carrier Phase Rotation

The integration period may be extended in software by using a combination of data transition knowledge and the carrier phase rotation technique described above. Longer integration provides a higher signal-to-noise ratio for the pseudorange measurement.

Figure 28:
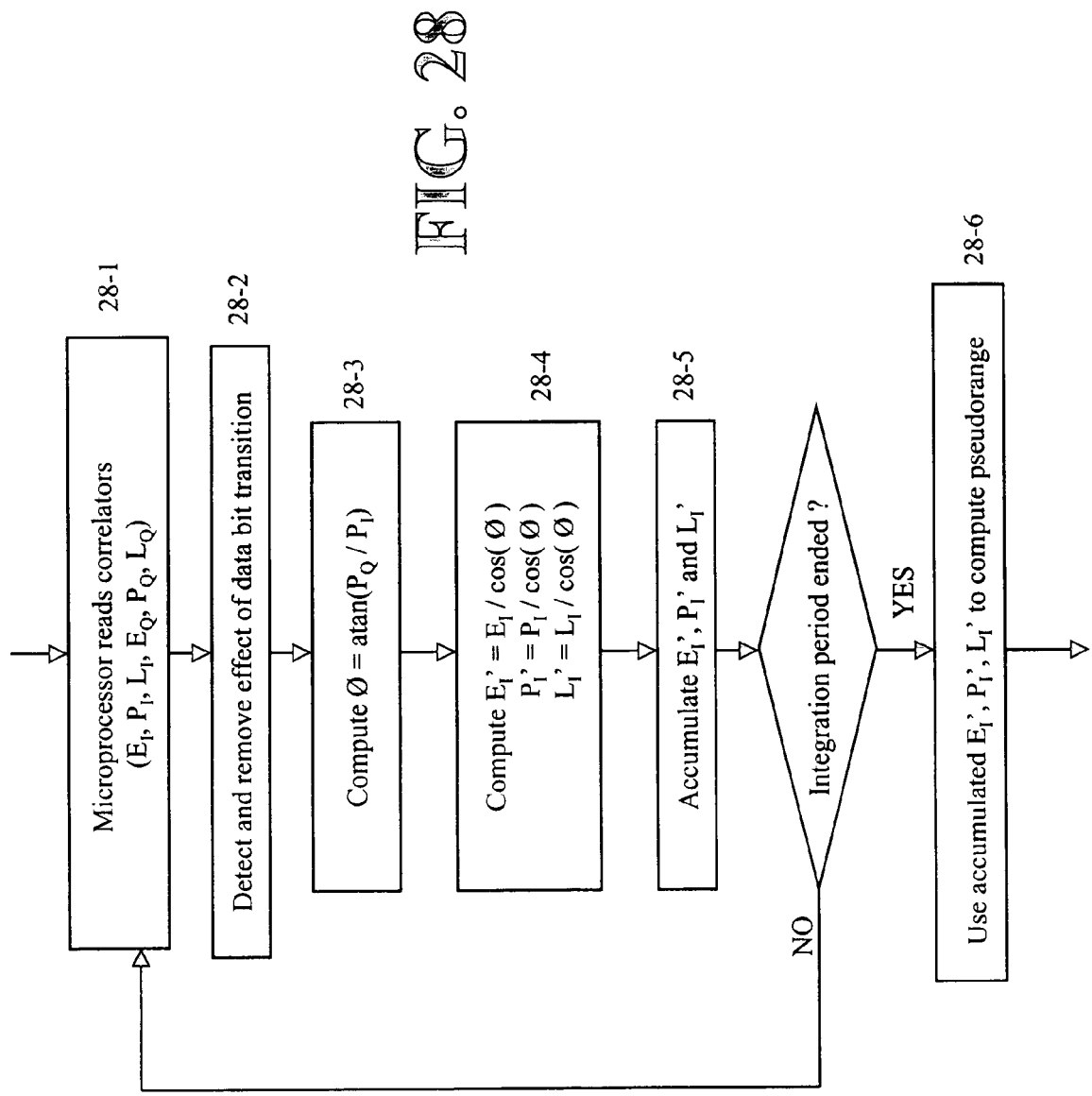
FIG. 28 is a flow chart of a method of extended integration with carrier phase rotation which is in accordance with the present invention.

FIG. 28 shows a method of extended integration with carrier phase rotation.

In step 28-1 the microprocessor reads the correlators. The effect of data bit transitions is removed in step 28-2 using data bit knowledge supplied via the SAAI or by detecting the transition using the technique described in connection with FIG. 24. The carrier phase is computed in step 28-3. In step 28-4 the correlator values are such that all the power appears in the I correlators. The $E_I'$, $P_I'$ and $L_I'$ values are accumulated in step 28-5 with previously generated values. If the integration period is not over, steps 28-1 through 28-5 are repeated. After the integration period has ended, the pseudorange is computed in step 28-6 by using the accumulated I correlators.

This process may be used to calculate pseudorange, in the presence of user position change and user clock drift, by using a longer integration period.

Scope, Notes and Discussion

A receiver that allows accelerated detection of signals apparatus has been described above. It also provides a more accurate measurement (when compared to prior art) when the signal is found (via WB mode). The invention includes an improvement to an otherwise standard GPS tracking channel. The invention includes an apparatus for improving the search rate for signals by using a memory processor and fast playback correlation.

Other enhancements may be made. As suggested above in the description in connection with FIG. 1, using a DCXO has an advantage over using, for example, an XO. The receiver described above accumulates the incoming signal across an integration period (e.g., 20 msecs). During the integration period the code phase position of the incoming satellite C/A code and the phase of the sampling clock should not be permitted to drift excessively. As an example of excessive drift, if the local oscillator is accurate to 1 part in $10^4$ in frequency the C/A code frequency offset caused by this would be 1.023 MHZ×1×$10^{-4}$, or 102.3 Hz. Therefore, during a 20 msec period the C/A code would drift by 0.02×102.3 chips (or 2.046 chips). Since, with such a drift, the samples would not appear at approximately the same place in the C/A code stream each msec, a sample during the first msec would be accumulated with a sample 2 chips away 20 msecs later. This would cause excessive signal loss. A remedy is either to use a better oscillator (typically accurate to 1×$10^{-6}$) or to apply an estimate of the oscillator offset (e.g., from SAAI information) to digitally control the DCXO output frequency so that it remains within acceptable tolerance levels for the problem described above.

The memory processor in the EDCP may be powered up only for the purpose of finding signals. Once signals are found, the memory processor may be powered down and the EDCP may be set to continuous tracking mode. In this way the E DCP channel uses little or no more power than an SDCP channel when in continuous tracking mode.

After the search for power, the correlators (I and Q) that contain the most power are defined as the punctual correlators (see FIG. 23). The correlators to the side of the punctual correlators are therefore the early (E) and late (L) correlators. Delay spacing between the correlators is set to the sample clock width. For 2.5 MHZ the delay spacings would be 0.4 secs. It is possible to perform the search for power using spacings that are longer (e.g., 1 C/A chip 1 sec), but this reduces the probability that a particular correlator pair (I and Q) will be close to the peak of the autocorrelation function.

Other improvements and modifications that become apparent to persons of ordinary skill in the art after reading this disclosure, the drawings and the appended claims are within the scope of the present invention.

What is claimed is:

1. An enhanced digital channel processor for as satellite positioning system (SATPS) receiver, comprising:

Means for receiving a down-converted SATPS in successive data bit periods and integrating said signal in an integration period longer than said data bit periods; and A memory processor having a storage device comprising two storage parts, wherein, during a low SNR and/or fast acquisition mode, said memory processor accumulates sums representative of samples of said down-converted SATPS signal in said integration period, stores the accumulated sums in one of said storage parts, and plays back at a substantially accelerated rate the sums stored in the other of said storage parts.

\* \* \* \* \*